(12) United States Patent
Khalate et al.

(10) Patent No.: US 11,835,945 B2
(45) Date of Patent: Dec. 5, 2023

(54) PREDICTIVE DIAGNOSTICS SYSTEM WITH FAULT DETECTOR FOR PREVENTATIVE MAINTENANCE OF CONNECTED EQUIPMENT

(71) Applicant: Johnson Controls Technology Company, Auburn Hills, MI (US)

(72) Inventors: Sumant S. Khalate, Pimpri Pune (IN); Tushar Shripad Joshi, Thane (IN); Dishant Mittal, Rohini (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 41 days.

(21) Appl. No.: 17/222,337

(22) Filed: Apr. 5, 2021

(65) Prior Publication Data

US 2021/0223769 A1 Jul. 22, 2021

Related U.S. Application Data

(63) Continuation of application No. 16/014,556, filed on Jun. 21, 2018, now Pat. No. 10,969,775.
(Continued)

(51) Int. Cl.
*G05B 23/02* (2006.01)
*G06F 17/18* (2006.01)
(Continued)

(52) U.S. Cl.
CPC ..... *G05B 23/0283* (2013.01); *G05B 23/0221* (2013.01); *G05B 23/0229* (2013.01);
(Continued)

(58) Field of Classification Search
CPC ............ G05B 23/0283; G05B 23/0221; G05B 23/0229; G05B 17/02; G05B 2219/2642; G06F 17/18; G06N 7/005
See application file for complete search history.

(56) References Cited

U.S. PATENT DOCUMENTS 8,843,238 B2 9/2014 Wenzel et al.
10,088,818 B1 * 10/2018 Mathews ............... G05B 15/02
(Continued)

OTHER PUBLICATIONS

Moreno MV, Úbeda B, Skarmeta AF, Zamora MA. How can we tackle energy efficiency in IoT based smart buildings? Sensors (Basel). May 30, 2014;14(6):9582-614. doi: 10.3390/s140609582. PMID: 24887040; PMCID: PMC4118407. (Year: 2014).*
(Continued)

*Primary Examiner* — Raymond L Nimox
(74) *Attorney, Agent, or Firm* — Foley & Lardner LLP

(57) ABSTRACT

A building management system includes connected equipment configured to measure a plurality of monitored variables and a predictive diagnostics system configured to receive the monitored variables from the connected equipment; generate a probability distribution of the plurality of monitored variables; determine a boundary for the probability distribution using a supervised machine learning technique to separate normal conditions from faulty conditions indicated by the plurality of monitored variables; separate the faulty conditions into sub-patterns using an unsupervised machine learning technique to generate a fault prediction model, each sub-pattern corresponding with a fault, and each fault associated with a fault diagnosis; receive a current set of the monitored variables from the connected equipment; determine whether the current set of monitored variables correspond with one of the sub-patterns of the fault prediction model to facilitate predicting whether a corresponding fault will occur; and determining the fault diagnosis associated with the predicted fault.

19 Claims, 14 Drawing Sheets

Related U.S. Application Data

(60) Provisional application No. 62/524,135, filed on Jun. 23, 2017.

(51) Int. Cl.

| | | |
|---|---|---|
| G06N 7/01 | (2023.01) | |
| G05B 17/02 | (2006.01) | |
| G06N 20/00 | (2019.01) | |
| G06N 5/045 | (2023.01) | |
| G06N 20/10 | (2019.01) | |
| G06N 5/046 | (2023.01) | |
| G06N 3/02 | (2006.01) | |

(52) U.S. Cl.
CPC ............ *G06F 17/18* (2013.01); *G06N 5/045* (2013.01); *G06N 7/01* (2023.01); *G06N 20/00* (2019.01); *G05B 17/02* (2013.01); *G05B 23/024* (2013.01); *G05B 2219/2642* (2013.01); *G06N 3/02* (2013.01); *G06N 5/046* (2013.01); *G06N 20/10* (2019.01)

(56) References Cited

U.S. PATENT DOCUMENTS

| | | |
|---|---|---|
| 2011/0047418 A1 | 2/2011 | Drees et al. |
| 2011/0061015 A1 | 3/2011 | Drees et al. |
| 2011/0178977 A1 | 7/2011 | Drees |
| 2012/0022700 A1 | 1/2012 | Drees et al. |
| 2012/0259583 A1 | 10/2012 | Noboa et al. |
| 2013/0245837 A1* | 9/2013 | Grohman ............... F24F 11/30 700/276 |
| 2014/0172400 A1* | 6/2014 | Majewski ............. F24F 1/0035 702/34 |
| 2014/0249876 A1* | 9/2014 | Wu ................... G06Q 10/0631 705/7.12 |
| 2014/0266669 A1* | 9/2014 | Fadell ..................... H04W 4/80 340/501 |
| 2014/0297001 A1* | 10/2014 | Silverman .............. G05B 15/02 700/19 |
| 2015/0120015 A1* | 4/2015 | Fadell .................... G05B 15/02 700/90 |
| 2015/0156031 A1* | 6/2015 | Fadell .................. G08B 19/005 700/90 |
| 2015/0178865 A1* | 6/2015 | Anderson ............ G06Q 50/163 705/7.25 |
| 2015/0227870 A1 | 8/2015 | Noboa et al. |
| 2015/0316907 A1 | 11/2015 | Elbsat et al. |
| 2017/0108236 A1* | 4/2017 | Guan ................... G05B 19/042 |
| 2017/0195130 A1* | 7/2017 | Landow ................. G05B 15/02 |
| 2017/0205783 A1* | 7/2017 | Tannenbaum ......... G05B 15/02 |
| 2017/0309142 A1* | 10/2017 | Phillips ................. G05B 15/02 |
| 2017/0314800 A1 | 11/2017 | Bengea et al. |
| 2017/0328997 A1* | 11/2017 | Silverstein ............ G01S 13/765 |
| 2017/0329449 A1* | 11/2017 | Silverstein ............. G01S 7/006 |
| 2018/0291832 A1 | 10/2018 | Whitney et al. |
| 2018/0351762 A1* | 12/2018 | Iyengar ............... H04L 12/2827 |

OTHER PUBLICATIONS

J. Martinez-Gil, G. Chasparis, B. Freudenthaler and T. Natschlaeger, "Realistic User Behavior Modeling for Energy Saving in Residential Buildings," 2014 25th International Workshop on Database and Expert Systems Applications, Munich, Germany, 2014, pp. 121-125, doi: 10.1109/DEXA.2014.38. (Year: 2014).*

J. Pan, R. Jain, S. Paul, T. Vu, A. Saifullah and M. Sha, "An Internet of Things Framework for Smart Energy in Buildings: Designs, Prototype, and Experiments," in IEEE Internet of Things Journal, vol. 2, No. 6, pp. 527-537, Dec. 2015, doi: 10.1109/JIOT.2015. 2413397 (Year: 2015).*

* cited by examiner

PREDICTIVE DIAGNOSTICS SYSTEM WITH FAULT DETECTOR FOR PREVENTATIVE MAINTENANCE OF CONNECTED EQUIPMENT

CROSS-REFERENCE TO RELATED PATENT APPLICATION

This application is a continuation of U.S. application Ser. No. 16/014,556, filed Jun. 21, 2018, which claims the benefit of U.S. Provisional Patent Application No. 62/524,135, filed Jun. 23, 2017, both applications are incorporated herein by reference in their entireties.

BACKGROUND

The present disclosure relates generally to building management systems. The present disclosure relates more particularly to fault detection and diagnostics in a building management system. A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

Systems and devices in a BMS often generate temporal (i.e., time-series) data that can be analyzed to determine the performance of the BMS and the various components thereof. The data generated by the BMS can include measured or calculated values that exhibit statistical characteristics and provide information about how the corresponding system or process (e.g., a temperature control process, a flow control process, etc.) is performing in terms of error from its setpoint. These data can be examined by a predictive diagnostics system to expose when the monitored system or process begins to degrade in performance and alert a user to repair the fault before it becomes more severe.

SUMMARY

One implementation of the present disclosure is a building management system. The building management system includes connected equipment configured to measure a plurality of monitored variables and a predictive diagnostics system. The predictive diagnostics system is configured to receive the plurality of monitored variables from the connected equipment; generate a probability distribution of the plurality of monitored variables; determine a boundary for the probability distribution using a supervised machine learning technique to separate normal conditions from faulty conditions indicated by the plurality of monitored variables; separate the faulty conditions into sub-patterns using an unsupervised machine learning technique to generate a fault prediction model, wherein each sub-pattern corresponds with a fault, and wherein each fault is associated with a fault diagnosis; receive a current set of the plurality of monitored variables from the connected equipment; determine whether the current set of the plurality of monitored variables corresponds with one of the sub-patterns of the fault prediction model to facilitate predicting whether a corresponding fault will occur; and determine the fault diagnosis associated with a predicted fault to facilitate taking preventative measures.

Another implementation of the present disclosure is a method for performing predictive diagnostics on connected equipment of a building management system. The method includes connecting a processing circuit of the building management system to the connected equipment, the connected equipment including one or more sensors positioned to acquire data regarding a plurality of monitored variables indicative of operation of the connected equipment; receiving, by the processing circuit, the plurality of monitored variables; generating, by the processing circuit, a probability distribution of the plurality of monitored variables; determining, by the processing circuit, a boundary for the probability distribution to separate normal conditions from faulty conditions indicated by the plurality of monitored variables; separating, by the processing circuit, the faulty conditions into sub-patterns to generate a fault prediction model, wherein each sub-pattern corresponds with a fault, and wherein each fault is associated with a fault diagnosis; receiving, by the processing circuit, a current set of the plurality of monitored variables from the connected equipment; determining, by the processing circuit, whether the current set of the plurality of monitored variables corresponds with one of the sub-patterns of the fault prediction model to facilitate predicting whether a corresponding fault will occur; determining, by the processing circuit, the fault diagnosis associated with a predicted fault based on which of the sub-patterns of the fault prediction model the current set of the plurality of monitored variables corresponds with; and at least one of (i) providing, by the processing circuit to an output device, an indication of the fault diagnosis with a recommended action to facilitate manual repair of the connected equipment by an operator based on the fault diagnosis to prevent the predicted fault or (ii) performing, by the processing circuit, an automated control action based on the fault diagnosis to at least one of prevent or compensate for the predicted fault.

Another implementation of the present disclosure is a building management system for a building. The building management system includes building subsystems and a controller. The building subsystems include at least one of a heating, ventilation, and air conditioning (HVAC) system, a lighting system, or a security system. The controller is coupled to the building subsystems. The controller is configured to receive room usage data regarding use of a respective room of the building, the room usage data including information regarding at least one of a temperature setpoint, a light level, an occupancy count, a time of a day, and the day of a week; determine usage patterns in the room usage data using unsupervised machine learning; generate at least one of a time profile or a user profile to correlate the usage patterns with preferences for the respective room at least one of at a respective time or for a respective occupant; and control the building subsystems based on the at least one of the time profile or the user profile.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, a building management system (BMS) and various components thereof are shown, according to some embodiments. The BMS includes sensors, building equipment, a building controller, and a predictive diagnostics system. The sensors monitor variables in or around a building and the building equipment operate to affect one or more of the monitored variables. The building controller generates control signals for the building equipment based on the monitored variables. The predictive diagnostics system is configured to generate fault predictions. Fault predictions may identify a particular fault, a particular device of the connected equipment in which the fault is predicted to occur, and/or an estimated time at which the fault is estimated to occur. Fault predictions can include fault indications as well as recommended actions to repair the connected equipment to prevent the fault from occurring. In some embodiments, the predictive diagnostics system provides the fault predictions to a building controller. The building controller can use the fault predictions to perform an automated control action. For example, the building controller can perform automated preventative actions to prevent the identified faults from occurring. These and other features of the predictive diagnostics system are described in greater detail below.

Building HVAC Systems and Building Management Systems

Figure 1:
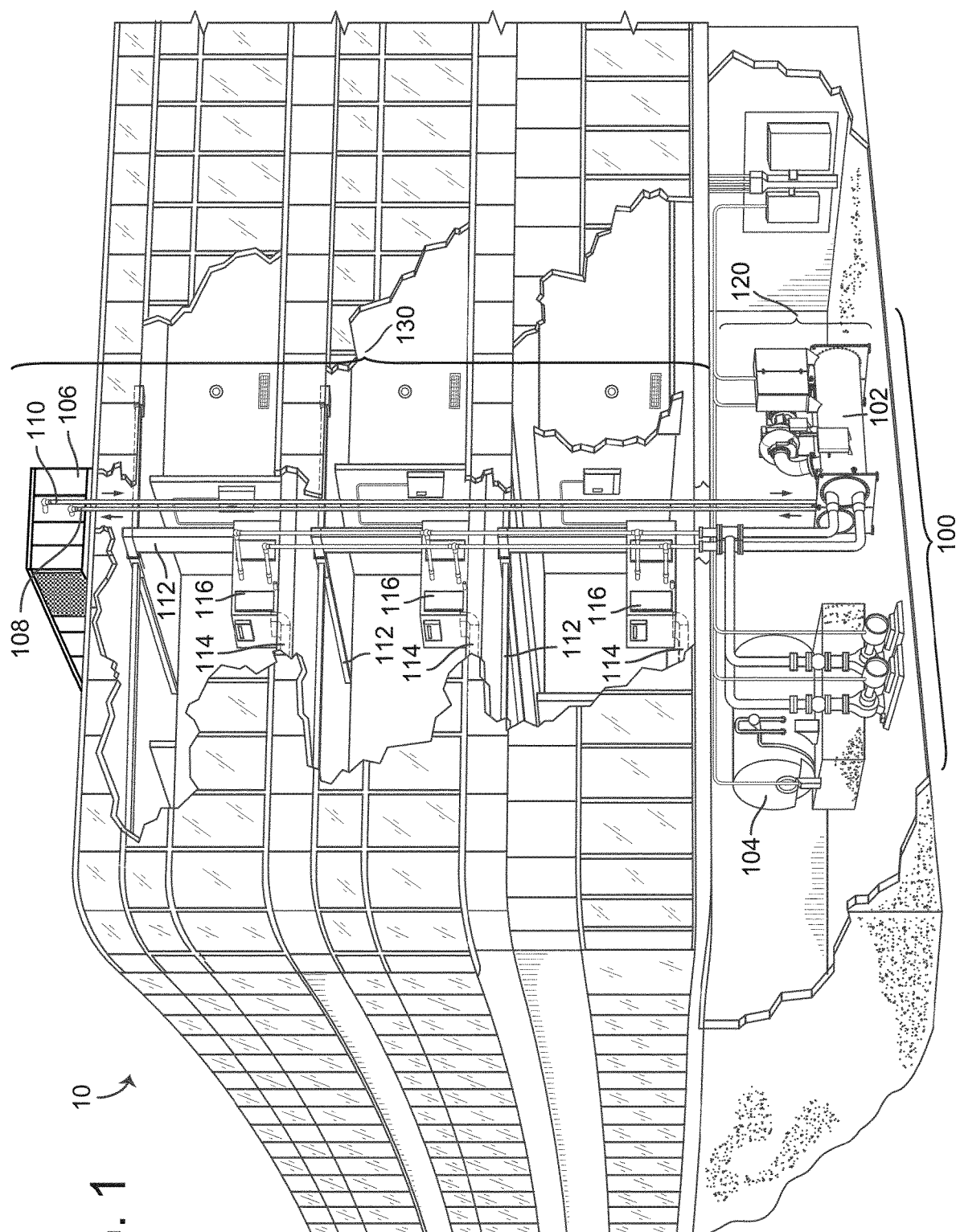
FIG. 1 is a drawing of a building equipped with a HVAC system, according to some embodiments.
Figure 2:
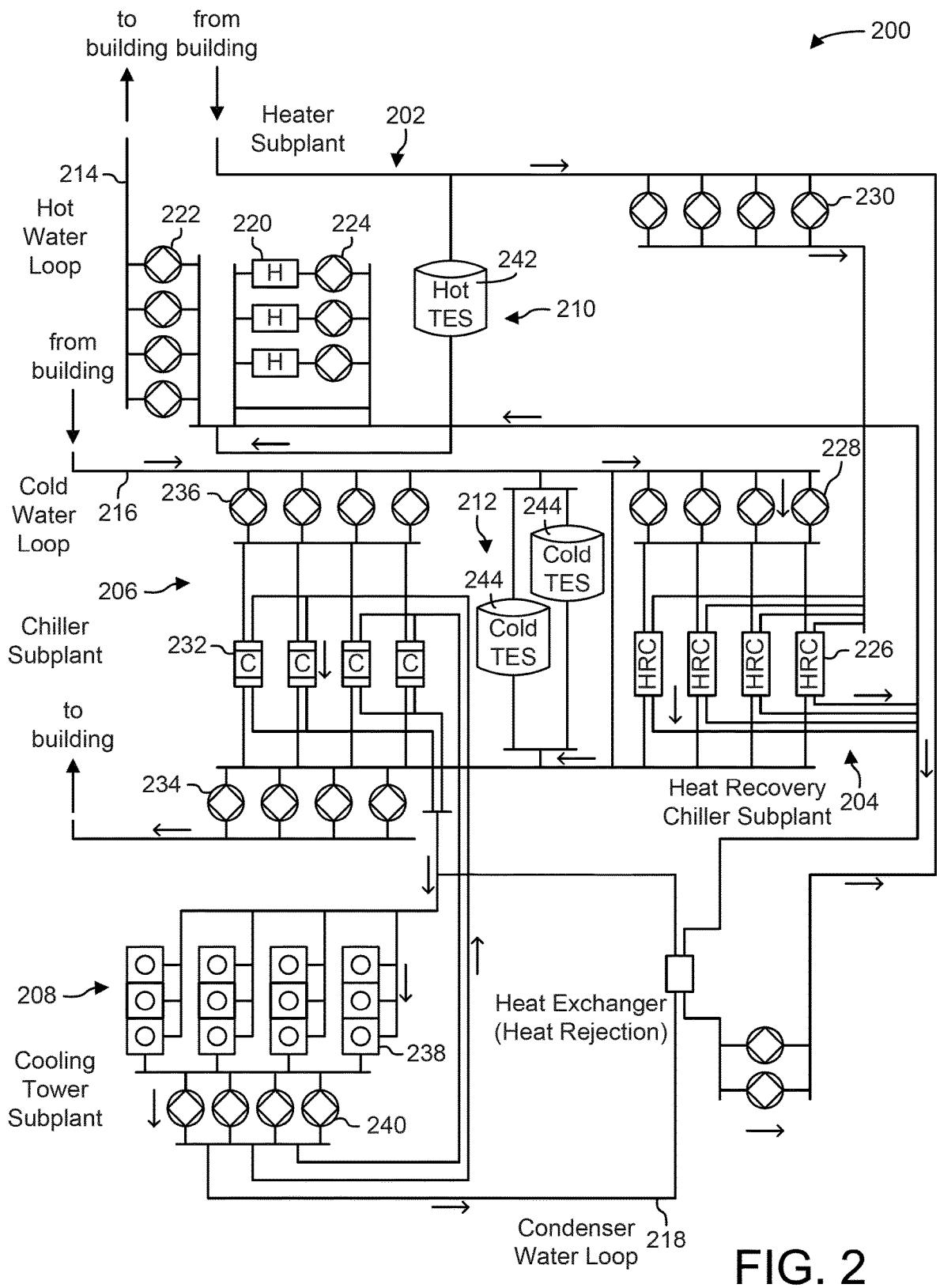
FIG. 2 is a schematic diagram of a waterside system which can be used in conjunction with the building of FIG. 1, according to some embodiments.
Figure 3:
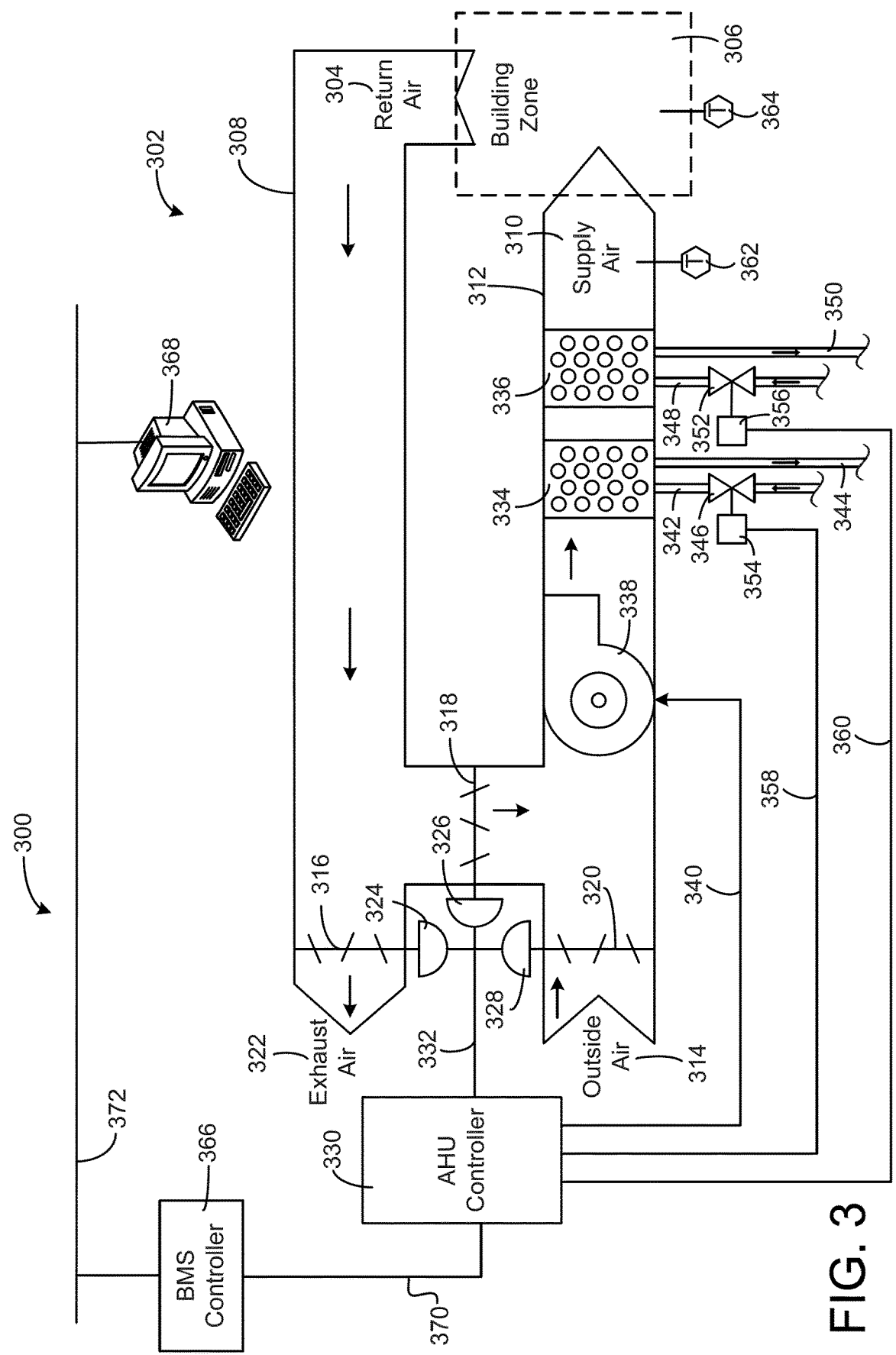
FIG. 3 is a schematic diagram of an airside system which can be used in conjunction with the building of FIG. 1, according to some embodiments.
Figure 4:
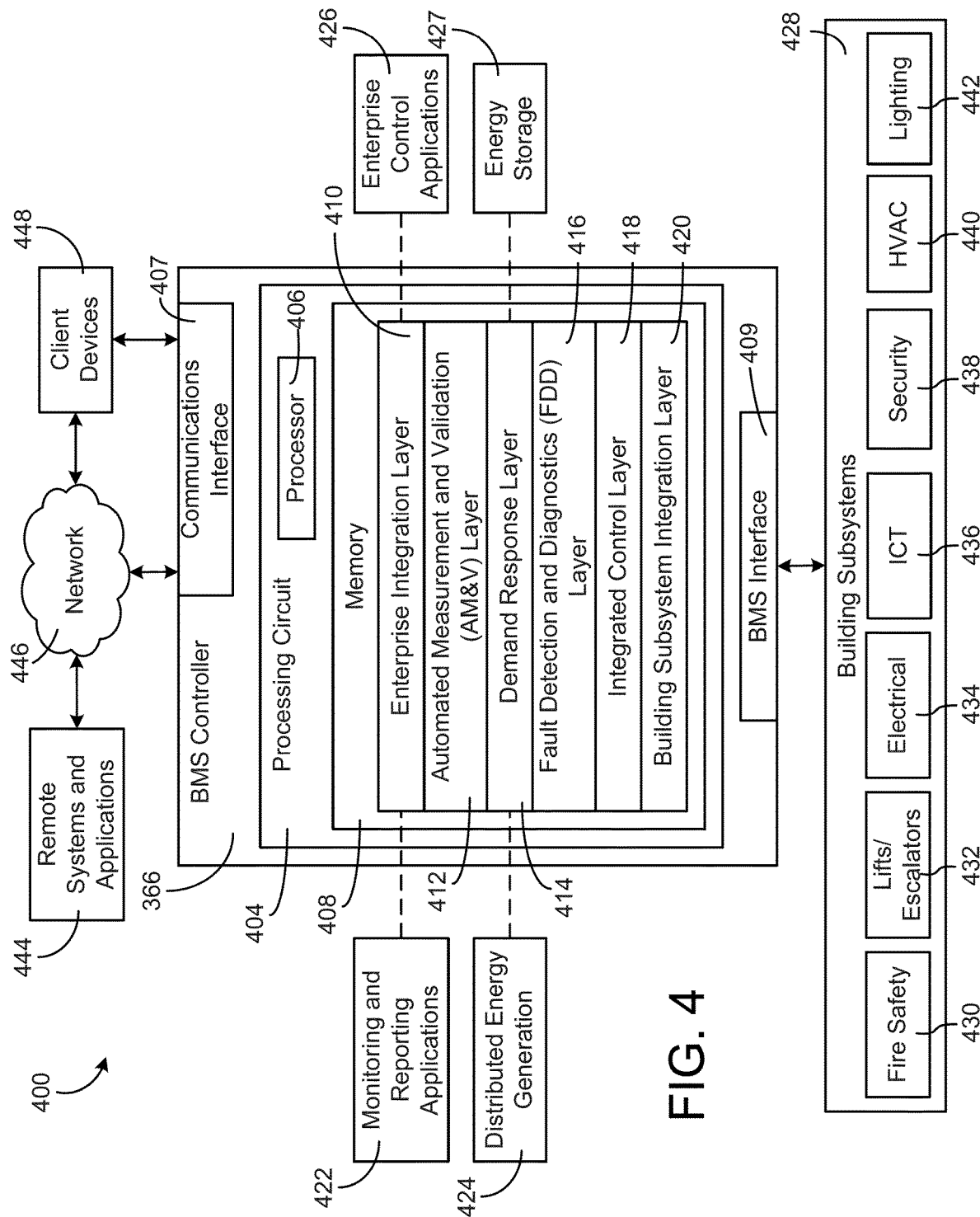
FIG. 4 is a block diagram of a building management system (BMS) which can be used to monitor and control the building of FIG. 1, according to some embodiments.
Figure 5:
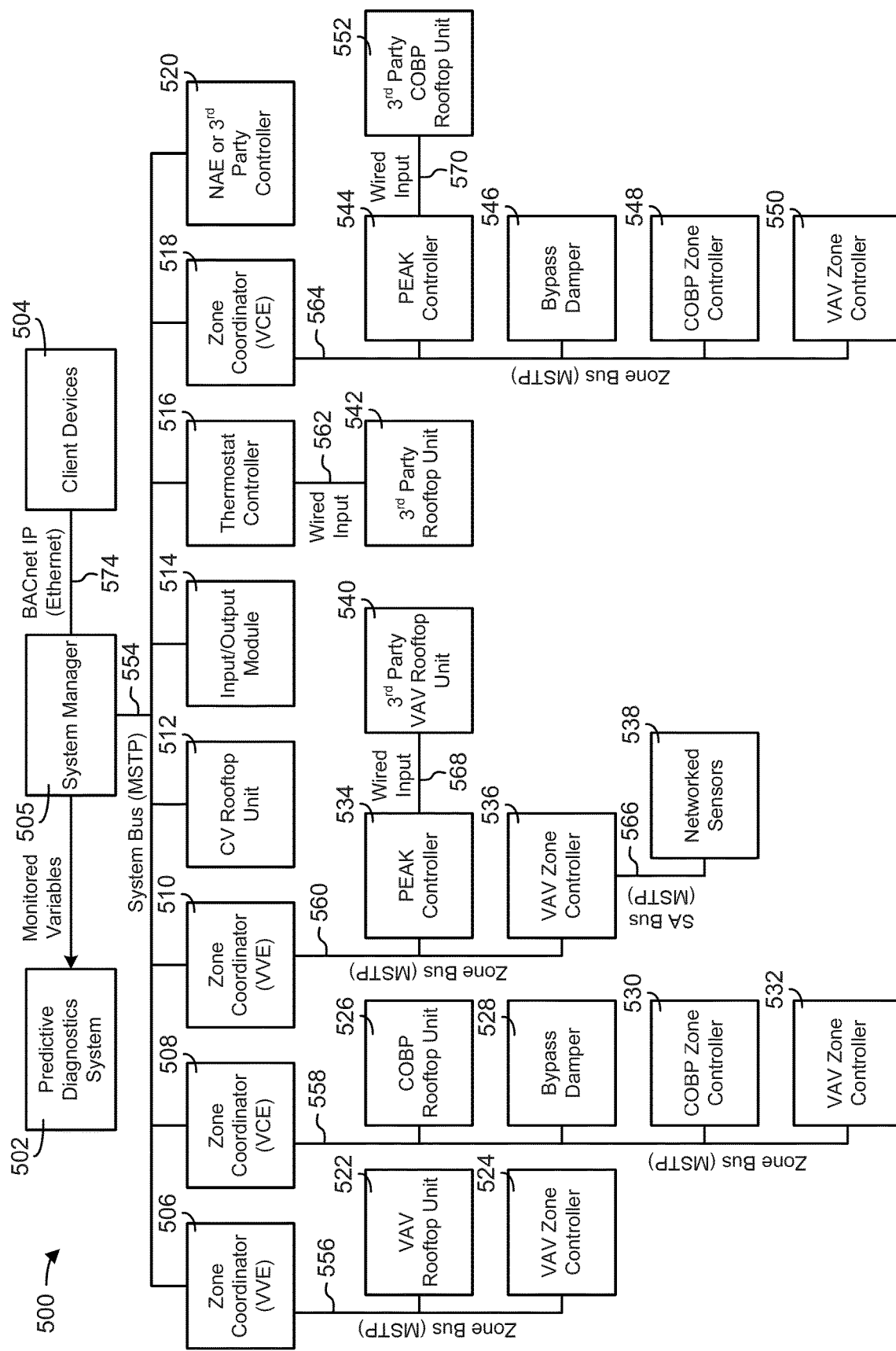
FIG. 5 is a block diagram of another BMS including a predictive diagnostics system which can be used to detect and diagnose faults in the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building 10 and HVAC System 100

Referring particularly to FIG. 1, a perspective view of building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2 and 3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System 200

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System 300

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management System 400

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, thermostats, and other devices for controlling the temperature, humidity, airflow, or other variable conditions within building 10. Lighting subsystem 442 can include any number of light fixtures, ballasts, lighting sensors, dimmers, and/or other devices configured to controllably adjust the amount of light provided to a building space. Security subsystem 438 can include occupancy sensors, video surveillance cameras, digital video recorders, video processing servers, intrusion detection devices, access control devices and servers, and/or other security-related devices.

Still referring to FIG. 4, BMS controller 366 is shown to include a communications interface 407 and a BMS interface 409. Communications interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Communications interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Communications interfaces 407 and/or BMS interface 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via communications interfaces 407 and/or BMS interface 409 can be direct (e.g., local wired or wireless communications) or via a communications network 446 (e.g., a WAN, the Internet, a cellular network, etc.). For example, communications interfaces 407 and/or BMS interface 409 can include an Ethernet card and port for sending and receiving data via an Ethernet-based communications link or network. In another example, communications interfaces 407 and/or BMS interface 409 can include a Wi-Fi transceiver for communicating via a wireless communications network. In another example, one or both of communications interfaces 407 and BMS interface 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via communications interfaces 407 and/or BMS interface 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD)

layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at communications interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs (e.g., internal to building 10, external to building 10, etc.) such as temperature, carbon dioxide levels, relative humidity levels, air quality sensor outputs, occupancy sensor outputs, room schedules, weather conditions, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints, etc.) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface, etc.) so that the control actions initiated in response to demand inputs can be tailored for the user's application, desired comfort level, particular building equipment, and/or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and/or when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, and/or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage, etc.) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Building Management System 500

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a predictive diagnostics system 502, a system manager 503; several zone coordinators 506, 508, 510 and 518; and several zone controllers 524, 530, 532, 536, 548, and 550. System manager 503 can monitor various data points in BMS 500 and report monitored variables to predictive diagnostics system 502. System manager 503 can communicate with client devices 504 (e.g., user devices, desktop computers, laptop computers, mobile devices, etc.) via a data communications link 574 (e.g., BACnet IP, Ethernet, wired or wireless communications, etc.). System manager 503 can provide a user interface to client devices 504 via data communications link 574. The user interface may allow users to monitor and/or control BMS 500 via client devices 504.

In some embodiments, system manager 503 is connected with zone coordinators 506-510 and 518 via a system bus 554. System manager 503 can be configured to communicate with zone coordinators 506-510 and 518 via system bus 554 using a master-slave token passing (MSTP) protocol or any other communications protocol. System bus 554 can also connect system manager 503 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 503 and can be connected directly to system bus 554. Other RTUs can communicate with system manager 503 via an intermediate device. For example, a wired input 562 can connect a third-party RTU 542 to thermostat controller 516, which connects to system bus 554.

System manager 503 can provide a user interface for any device containing an equipment model. Devices such as zone coordinators 506-510 and 518 and thermostat controller 516 can provide their equipment models to system manager 503 via system bus 554. In some embodiments, system manager 503 automatically creates equipment models for connected devices that do not contain an equipment model (e.g., IOM 514, third party controller 520, etc.). For example, system manager 503 can create an equipment model for any device that responds to a device tree request. The equipment models created by system manager 503 can be stored within system manager 503. System manager 503 can then provide a user interface for devices that do not contain their own equipment models using the equipment models created by system manager 503. In some embodiments, system manager 503 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Connected Equipment and Predictive Diagnostics

Figure 6A:
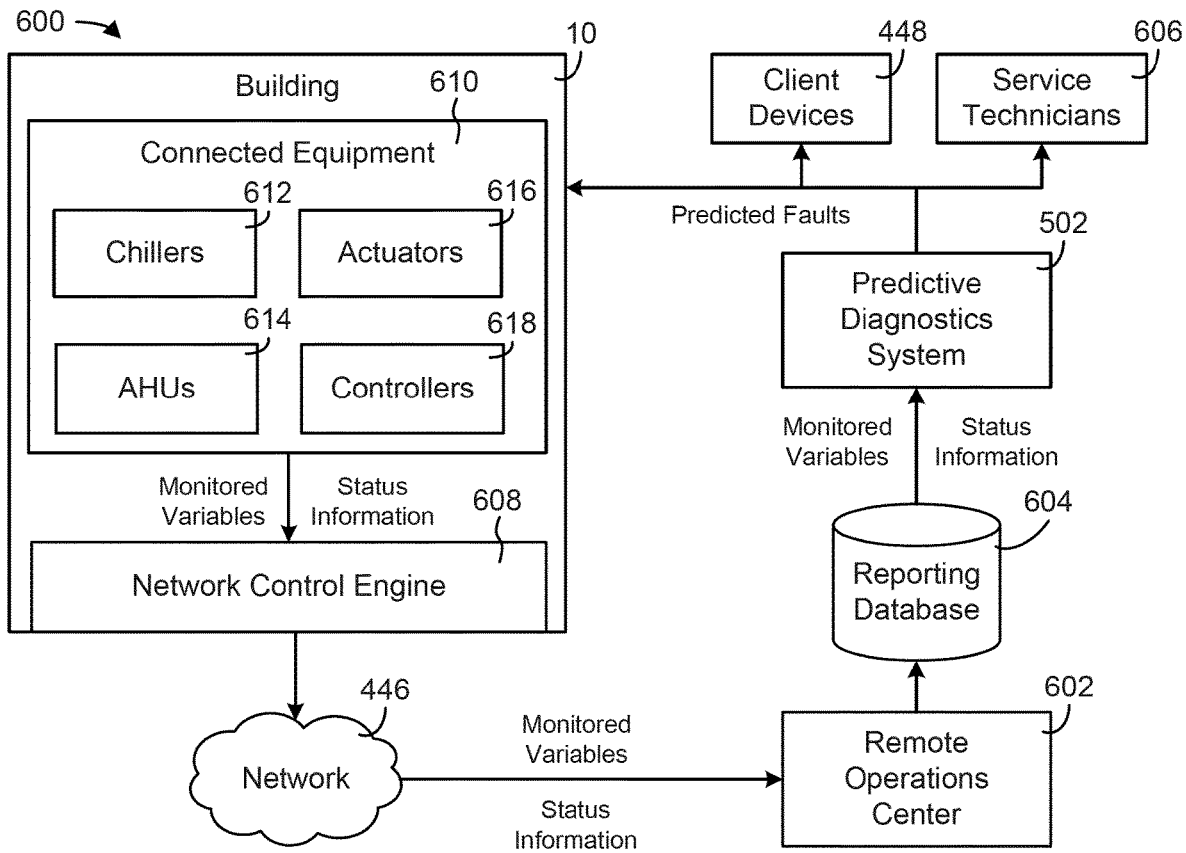
FIG. 6A is a block diagram of yet another BMS including the predictive diagnostics system, according to some embodiments.

Referring now to FIG. 6A, a block diagram of another building management system (BMS) 600 is shown, according to some embodiments. BMS 600 can include many of the same components as BMS 400 and BMS 500 as described with reference to FIGS. 4 and 5. For example, BMS 600 is shown to include building 10, network 446, client devices 448, and predictive diagnostics system 502. Building 10 is shown to include connected equipment 610, which can include any type of equipment used to monitor and/or control building 10. Connected equipment 610 can include connected chillers 612, connected AHUs 614, connected actuators 616, connected controllers 618, or any other type of equipment in a building HVAC system (e.g., boilers, economizers, valves, dampers, cooling towers, fans, pumps, etc.) or building management system (e.g., lighting equipment, security equipment, refrigeration equipment, etc.). Connected equipment 610 can include any of the equipment of HVAC system 100, waterside system 200, airside system 300, BMS 400, and/or BMS 500, as described with reference to FIGS. 1-5.

Connected equipment 610 can be outfitted with sensors to monitor particular conditions of the connected equipment 610. For example, chillers 612 can include sensors configured to monitor chiller variables such as chilled water return temperature, chilled water supply temperature, chilled water flow status (e.g., mass flow rate, volume flow rate, etc.), condensing water return temperature, condensing water supply temperature, motor amperage (e.g., of a compressor, etc.), variable speed drive (VSD) output frequency, and refrigerant properties (e.g., refrigerant pressure, refrigerant temperature, condenser pressure, evaporator pressure, etc.) at various locations in the refrigeration circuit. An example of a chiller 650 which can be used as one of chillers 612 is described in greater detail with reference to FIG. 6B. Similarly, AHUs 614 can be outfitted with sensors to monitor AHU variables such as supply air temperature and humidity, outside air temperature and humidity, return air temperature and humidity, chilled fluid temperature, heated fluid temperature, damper position, etc. In general, connected equipment 610 monitor and report variables that characterize the performance of the connected equipment 610. Each monitored variable can be forwarded to network control engine 608 as a data point (e.g., including a point ID, a point value, etc.).

Monitored variables can include any measured or calculated values indicating the performance of connected equipment 610 and/or the components thereof. For example, monitored variables can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients, etc.), and/or any other time-series values that provide information about how the corresponding system, device, and/or process is performing. Monitored variables can be received from connected equipment 610 and/or from various components thereof. For example, monitored variables can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), and/or collections of BMS devices.

Connected equipment 610 can also report equipment status information. Equipment status information can include, for example, the operational status of the equipment, an operating mode (e.g., low load, medium load, high load, etc.), an indication of whether the equipment is running under normal or abnormal conditions, a safety fault code, and/or any other information that indicates the current status of connected equipment 610. In some embodiments, each device of connected equipment 610 includes a control panel (e.g., control panel 660 shown in FIG. 6B). The control panel can use the sensor data to shut down the device if the control panel determines that the device is operating under unsafe conditions. For example, the control panel can compare the sensor data (or a value derived from the sensor data) to predetermined thresholds. If the sensor data or calculated value crosses a safety threshold, the control panel can shut down the device and/or operate the device at a derated setpoint. The control panel can generate a data point when a safety shut down or a derate occurs. The data point can include a safety fault code which indicates the reason or condition that triggered the shut down or derate.

Connected equipment 610 can provide monitored variables and equipment status information to a network control engine 608. Network control engine 608 can include a building controller (e.g., BMS controller 366), a system manager (e.g., system manager 503), a network automation engine (e.g., NAE 520), or any other system or device of building 10 configured to communicate with connected equipment 610. In some embodiments, the monitored variables and the equipment status information are provided to network control engine 608 as data points. Each data point can include a point ID and/or a point value. The point ID can identify the type of data point and/or a variable measured by the data point (e.g., condenser pressure, refrigerant temperature, fault code, etc.). Monitored variables can be identified by name or by an alphanumeric code (e.g., Chilled_Water_Temp, 7694, etc.). The point value can include an alphanumeric value indicating the current value of the data point (e.g., 44° F., fault code 4, etc.).

Network control engine 608 can broadcast the monitored variables and the equipment status information to a remote operations center (ROC) 602. ROC 602 can provide remote monitoring services and can send an alert to building 10 in the event of a critical alarm. ROC 602 can push the monitored variables and equipment status information to a reporting database 604, where the data is stored for reporting and analysis. Predictive diagnostics system 502 can access database 604 to retrieve the monitored variables and the equipment status information.

In some embodiments, predictive diagnostics system 502 is a component of BMS controller 366 (e.g., within FDD layer 416). For example, predictive diagnostics system 502 can be implemented as part of a METASYS® brand building automation system, as sold by Johnson Controls Inc. In other embodiments, predictive diagnostics system 502 can be a component of a remote computing system or cloud-based computing system configured to receive and process data from one or more building management systems. For example, predictive diagnostics system 502 can be implemented as part of a PANOPTIX® brand building efficiency platform, as sold by Johnson Controls Inc. In other embodiments, predictive diagnostics system 502 can be a component of a subsystem level controller (e.g., a HVAC controller, etc.), a subplant controller, a device controller (e.g., AHU controller 330, a chiller controller, etc.), a field controller, a computer workstation, a client device, and/or any other system and/or device that receives and processes monitored variables from connected equipment 610.

Predictive diagnostics system 502 may use the monitored variables to identify a current operating state of connected equipment 610. The current operating state can be examined by predictive diagnostics system 502 to expose when connected equipment 610 begins to degrade in performance and/or to predict when faults will occur. In some embodiments, predictive diagnostics system 502 determines whether the current operating state is a normal operating state or a faulty operating state. Predictive diagnostics system 502 may report the current operating state and/or the predicted faults to client devices 448, service technicians 606, building 10, and/or any other system and/or device. Communications between predictive diagnostics system 502 and other systems and/or devices can be direct and/or via an intermediate communications network, such as network 446. If the current operating state is identified as a faulty state or moving toward a faulty state, predictive diagnostics system 502 may generate an alert or notification for service technicians 606 to repair the fault or potential fault before it becomes more severe. In some embodiments, predictive diagnostics system 502 uses the current operating state to determine an appropriate control action for connected equipment 610.

In some embodiments, predictive diagnostics system 502 uses principal component analysis (PCA) models to identify the current operating state. PCA is a multivariate statistical technique that takes into account correlations between two or more monitored variables. Predictive diagnostics system 502 may use the monitored variables to create a plurality of PCA models. Each of the PCA models may characterize the behavior of the monitored system, device, or process in a particular operating state. Predictive diagnostics system 502 may store the PCA models in a library of operating states (e.g., in memory or a database). Predictive diagnostics system 502 may use the library of operating states to determine whether new samples of the monitored variables correspond to any of the previously-stored operating states.

In some embodiments, predictive diagnostics system 502 includes a data analytics and visualization platform. Predictive diagnostics system 502 can analyze the monitored variables to predict when a fault will occur in the connected equipment 610. Predictive diagnostics system 502 can predict the type of fault and a time at which the fault will occur. For example, predictive diagnostics system 502 can predict when connected equipment 610 will next report a safety fault code that triggers a device shut down. Advantageously, the faults predicted by predictive diagnostics system 502 can be used to determine that connected equipment 610 is in need of preventative maintenance to avoid an unexpected shut down due to the safety fault code. Predictive diagnostics system 502 can provide the predicted faults to service technicians 606, client devices 448, building 10, or other systems or devices.

In some embodiments, predictive diagnostics system 502 provides a web interface which can be accessed by service technicians 606, client devices 448, and other systems or devices. The web interface can be used to access the raw data in reporting database 604, view the results of the predictive diagnostics, identify which equipment is in need of preventative maintenance, and otherwise interact with predictive diagnostics system 502. Service technicians 606 can access the web interface to view a list of equipment for which faults are predicted by predictive diagnostics system 502. Service technicians 606 can use the predicted faults to proactively repair connected equipment 610 before a fault and/or an unexpected shut down occurs. These and other features of predictive diagnostics system 502 are described in greater detail below.

Connected Equipment Example: Chiller

Figure 6B:
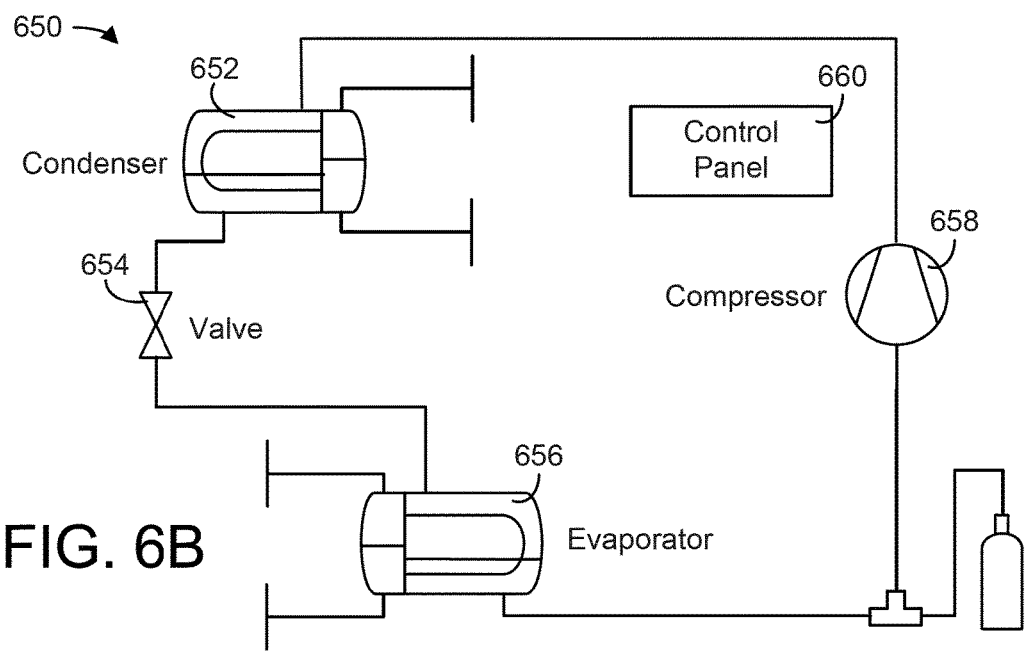
FIG. 6B is a schematic diagram of a chiller, which is an example of a type of connected equipment which can report monitored variables and status information to the predictive diagnostics system, according to some embodiments.

Referring now to FIG. 6B, a schematic diagram of a chiller 650 is shown, according to some embodiments. Chiller 650 is an example of a type of connected equipment 610 which can report monitored variables and status information to predictive diagnostics system 502. Chiller 650 is shown to include a refrigeration circuit having a condenser 652, an expansion valve 654, an evaporator 656, a compressor 658, and a control panel 660. In some embodiments, chiller 650 includes sensors that measure a set of monitored variables at various locations along the refrigeration circuit. Table 1 describes an exemplary set of monitored parameters/variables that can be measured in chiller 650. Predictive diagnostics system 502 can use these or other variables to detect the current operating state of chiller 650, detect faults, predict potential/future faults, and/or determine diagnoses. Predictive diagnostics system 502 may additionally use external parameters such as weather conditions and geographical location where the chiller 650 is operating.

TABLE 1

Monitored Chiller Parameters

| Number | ID | Description |
|---|---|---|
| 1 | MOT-FLA | Working condition of chiller |
| 2 | CHWR-T | Chill water return temperature |
| 3 | CHWS-T | Chill water supply temperature |
| 4 | COND-P | Condenser pressure |
| 5 | EVAP-P | Evaporator pressure |
| 6 | CWR-P | Condensed water return temperature |
| 7 | CWS-P | Condensed water supply temperature |
| 8 | MTAMP-SP | Motor amperage |
| 9 | CHWTSP | Chill water supply temperature set point |
| 10 | VFD OP-Hz | Variable frequency drive output frequency |
| 11 | CHWF-STS | Chill water flow status |

Chiller 650 can be configured to operate in multiple different operating states. For example, chiller 650 can be operated in a low load state, a medium load state, a high load state, and/or various states therebetween. The operating states may represent the normal operating states or conditions of chiller 650. Faults in chiller 650 may cause the operation of chiller 650 to deviate from the normal operating states. For example, various types of faults may occur in each of the normal operating states. These faults may correspond to leaks, mechanical component failures, electrical component failures, etc.

Predictive diagnostics system 502 may build principal component analysis (PCA) models of the operating states by collecting samples of the monitored variables. For example, predictive diagnostics system 502 may collect 1000 samples of the monitored variables at a rate of one sample per second. The samples of monitored variables can be passed to a data scaler, PCA modeler, and/or other components of predictive diagnostics system 502 and used to construct PCA models for each of the operating states. After the state models are built, new samples of the monitored variables can be processed by predictive diagnostics system 502 to determine the current operating state of chiller 650. Predictive diagnostics system 502 can determine how close the current operating state is to each of the operating states represented by the PCA models. Predictive diagnostics system 502 can use the proximity of the current operating to states to each of the modeled operating states to predict when a fault will occur.

Predictive Diagnostics System

Faulty operations of HVAC chiller systems can lead to discomfort for the users, energy wastage, system unreliability, and shorter equipment life. It may therefore be advantageous to diagnose faults early to prevent deterioration of system behavior, energy losses, and/or increased costs. To increase the sustainability of BMS, more robust, scalable, and smart techniques are needed. Traditionally, rule-based diagnostic systems have been implemented to diagnose faults and/or failures. However, conventional, hardcoded, rule-based approaches tend to work only if all the situations under which decisions can be made are known and defined. By way of example, when a chiller gets operationalized, the chiller may have a finite number of rules (e.g., 5, 10, 15, etc.) to handle known faults that may occur with the chiller. Over time, as more faults arise in this system, more rules get manually entered into the system. As time goes by, adding new rules can get awkward and cumbersome, especially when data changes faster than one can keep up with the rules.

According to an exemplary embodiment, predictive diagnostics system 502 is configured to learn from past data and create an algorithmic model which can autonomously (i) update itself and make predictions according to the changing time frame and geographical conditions, (ii) recognize patterns exhibited by faults, and/or (iii) automatically find the most likely diagnostics by learning from the patterns exhibited by the faults. Predictive diagnostic system 502 (e.g., the integration of autonomous learning systems (ALS) within chiller operations, etc.) may make it is possible to minimize dependency on expert human operators for carrying out cumbersome tasks of predefining rule bases for each machine parameter separately and/or enable vendors and building owners to take prior measures for preventative maintenance of chillers.

As a brief overview, predicative diagnostics system 502 may start with gathering data and/or parameters from one or more chillers (e.g., chiller 650, see Table 1, etc.). Predicative diagnostics system 502 may then create a hypothetical separating hyperplane autonomously based on the cumulative probability distribution of the chiller parameters. This may help in learning the faulty situations for chiller operation. After that, predicative diagnostics system 502 may recognize patterns exhibited by discovered faults. An overall model developed by predicative diagnostics system 502 can be utilized to find unprecedented fault patterns. Predicative diagnostics system 502 may further be configured to predict whether real time operating conditions are "trending" to be faulty or are normal. For example, predictive diagnostics system 502 can determine that a chiller is trending toward a faulty state if the data gathered from the chiller are approaching a set of values previously classified as faulty. If the predicted conditions are becoming faulty, predicative diagnostics system 502 may implement an effective diagnostic scheme which may help in the rectification of the fault before it actually arises. Predicative diagnostics system 502 may also perform such analysis based on external parameters such as weather conditions and/or the geographical location where a chiller is operating.

Figure 7:
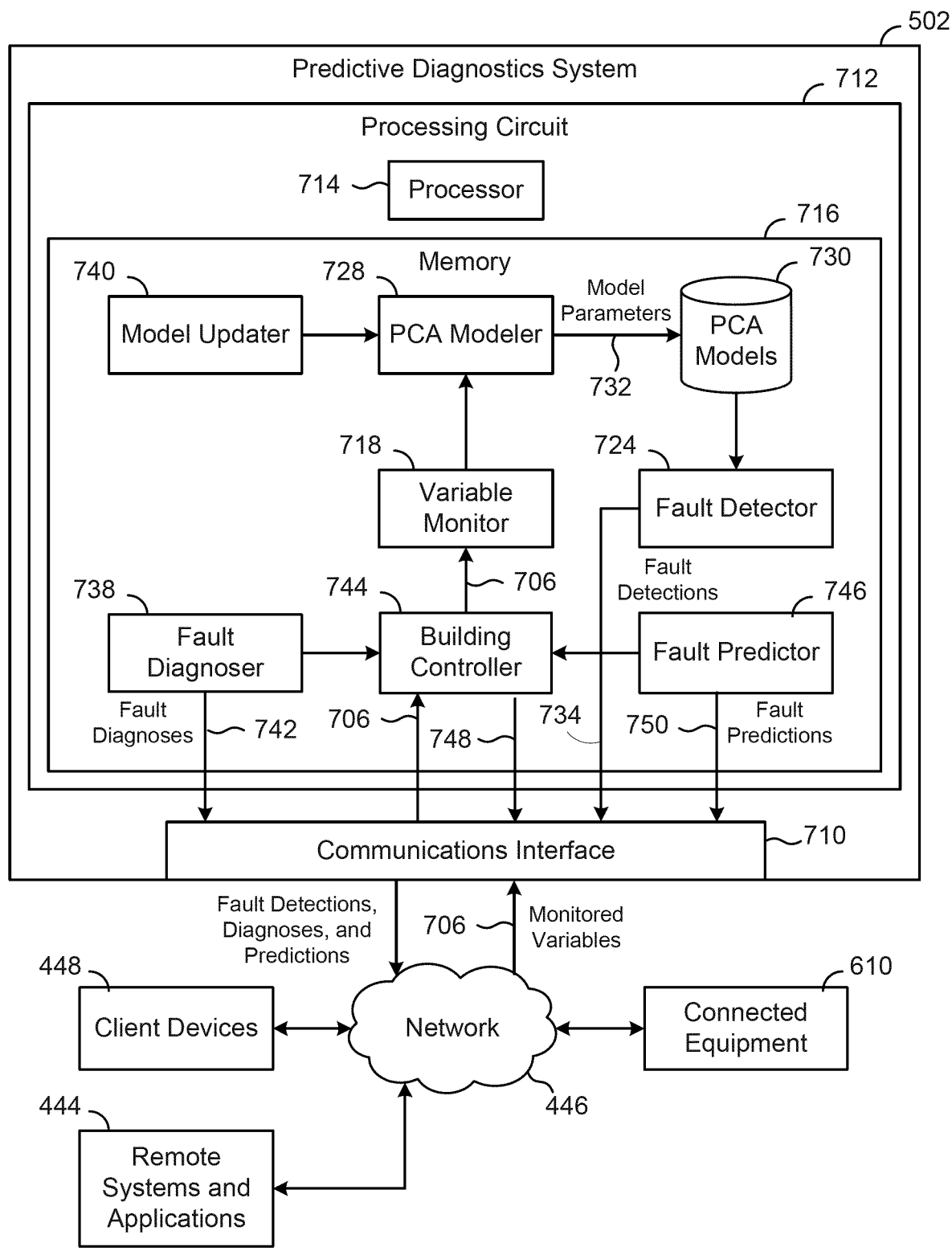
FIG. 7 is a block diagram of a predictive diagnostics system, according to some embodiments.

Referring now to FIG. 7, a block diagram illustrating predictive diagnostics system 502 in greater detail is shown, according to some embodiments. Predictive diagnostics system 502 is shown to include a communications interface 710 and a processing circuit 712. Communications interface 710 may facilitate communications between predictive diagnostics system 502 and various external systems or devices. For example, predictive diagnostics system 502 may receive the monitored variables from connected equipment 610 and provide control signals to connected equipment 610 via communications interface 710. Communications interface 710 may also be used to communicate with remote systems and applications 444, client devices 448, and/or any other external system or device. For example, predictive diagnostics system 502 may provide fault detections, diagnoses, and fault predictions to remote systems and applications 444, client devices 448, service technicians 606, or any other external system or device via communications interface 710.

Communications interface 710 can include any number and/or type of wired or wireless communications interfaces (e.g., jacks, antennas, transmitters, receivers, transceivers, wire terminals, etc.). For example, communications interface 710 can include an Ethernet card and port for sending and receiving data via an Ethernet-based communications link or network. As another example, communications interface 710 can include a WiFi transceiver, a NFC transceiver, a cellular transceiver, a mobile phone transceiver, or the like for communicating via a wireless communications network. In some embodiments, communications interface 710 includes RS232 and/or RS485 circuitry for communicating with BMS devices (e.g., chillers, controllers, etc.). Communications interface 710 can be configured to use any of a variety of communications protocols (e.g., BACNet, Modbus, N2, MSTP, Zigbee, etc.). Communications via interface 710 can be direct (e.g., local wired or wireless communications) or via an intermediate communications network 446 (e.g., a WAN, the Internet, a cellular network, etc.). Communications interface 710 can be communicably connected with processing circuit 712 such that processing circuit 712 and the various components thereof can send and receive data via communications interface 710.

Processing circuit 712 is shown to include a processor 714 and memory 716. Processor 714 can be implemented as a general purpose processor, an application specific integrated circuit (ASIC), one or more field programmable gate arrays (FPGAs), a group of processing components, or other suitable electronic processing components. Memory 716 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 716 can be or include volatile memory or non-volatile memory. Memory 716 can include database components, object code components, script components, or any other type of information structure for supporting the various activities and information structures described in the present application. According to some embodiments, memory 716 is communicably connected to processor 714 via processing circuit 712 and includes computer code for executing (e.g., by processing circuit 712 and/or processor 714) one or more processes described herein.

Still referring to FIG. 7, memory 716 is shown to include a variable monitor 718. Variable monitor 718 can be configured to monitor one or more variables (i.e., monitored variables 706) that indicate the performance of connected equipment 610 in real-time. For example, monitored variables 706 can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that provide information about how the corresponding system, device, or process is performing (e.g., see Table 1). The monitored variables 706 can be received from connected equipment 610 and/or from various devices thereof. For example, the monitored variables 706 can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices within building subsystems 428. Variable monitor 718 can also be configured to receive past data (e.g., monitored variables 706) that indicate the past performance history of connected equipment 610 (e.g., performance history for the past year, two years, etc.).

In some embodiments, the monitored variables 706 include n different time-series variables. Variable monitor 718 may gather measurements or other values (e.g., calculated or estimated values) of the n time-series variables (e.g., in a sample vector). Variable monitor 718 can be configured to collect m samples of each of the n time-series variables. Variable monitor 718 may generate a sample matrix including m samples of each of the n time-series variables.

In some embodiments, variable monitor 718 groups sample vectors based on an operating state during which the sample vectors were collected. For example, variable monitor 718 may group or segment the sample vectors collected during a first operating state (e.g., state 1) into a first sample matrix, and group the sample vectors collected during a second operating state (e.g., state 2) into a second sample matrix. Each of the sample matrices can include values of the monitored variables that represent a particular operating state. During a training period, the operating states associated with each of the sample vectors can be specified by a user or indicated by another data source. In some embodiments, variable monitor 718 automatically identifies the operating states based on the equipment status information received from connected equipment 610. In some embodiments, the variable monitor 718 addresses missing values in and/or performs various data cleansing processes on past and/or current monitored variables 706. Each of the sample matrices can be used by predictive diagnostics system 502 to generate a PCA model for a different operating state. Once the PCA models are generated, new sample vectors (or samples) can be collected and automatically identified by predictive diagnostics system 502 as belonging to a particular operating state or moving toward a particular operating state using the PCA models.

Still referring to FIG. 7, memory 716 is shown to include a principal component analysis (PCA) modeler 728. PCA modeler 728 can be configured to generate model parameters 732 for the PCA models 730 used by predictive diagnostics system 502 to perform the fault detection, diagnostic, and predictive diagnostic processes described herein. PCA modeler 728 can be configured to generate and store a PCA model 730 for each of a plurality of operating states based on an analysis of monitored variables 706 (e.g., see disclosure for FIGS. 8-12, based on a probability distribution of monitored variables 706, using supervised machine learning techniques, using unsupervised machine learning techniques, etc.). The stored PCA models 730 may define a library of operating states that can be identified for new samples of the monitored variables 706. For example, when a new sample of the monitored variables 706 is obtained, the sample can be indexed with respect to one or more of the stored operating states (e.g., using the PCA model parameters 732 for the operating state). Memory 716 is shown to include a model updater 740. Model updater 740 can be configured to update the PCA models 730 with new samples of monitored variables 706. PCA modeler 728 may use these variables as updated model parameters 732 to update PCA models 730.

Still referring to FIG. 7, memory 716 is shown to include a fault detector 724. Fault detector 724 can be configured to determine whether a given sample of monitored variables 706 indicates if connected equipment 610 is currently normal or faulty with respect to a particular operating state. Fault detector 724 may determine whether a given sample is normal or faulty with respect to an operating state by comparing the sample with a control limit or threshold. For example, fault detector 724 may determine that the sample is normal with respect to a respective state if the sample is within the control limit for the respective state. A sample that is normal with respect to the respective state indicates that the monitored system, device, or process is operating in the respective state when the sample is obtained. Fault detector 724 may determine that the sample is faulty with respect to the respective state if the sample is not within the control limit for the respective state. A sample that is faulty with respect to the respective state indicates that the monitored system, device, or process is not operating in the respective state when the sample is obtained.

Once a current operating state has been identified (by fault detector 724 and/or fault diagnoser 738), fault detector 724 may determine whether the identified operating state connected equipment 610 is currently operating at is normal or faulty. For example, fault detector 1124 may access a stored list, database, or other mapping that indicates which operating states are normal and which operating states are faulty. If the identified operating state is a normal operating state, fault detector 724 may not output a fault detection 734. However, if the identified operating state is a faulty operating state, fault detector 724 may output a fault detection 734. Fault detections 734 can be stored in memory and/or communicated to client devices 448, remote systems and applications 444, building subsystems 428, or any other external system or device.

Still referring to FIG. 7, memory 716 is shown to include a fault diagnoser 738. Fault diagnoser 738 can be configured to perform fault diagnosis to determine what may be causing a faulty operating state for connected equipment determined by fault detector 724. In some embodiments, unprecedented faults may require an operator to provide an input why the particular fault occurred. However, if the fault is a reoccurring fault, no such identification is needed. Fault diagnoses 742 can be stored in memory and/or communicated to client devices 448, remote systems and applications 444, building subsystems 428, or any other external system or device.

Still referring to FIG. 7, predictive diagnostics system 502 is shown to include a fault predictor 746. Fault predictor 746 uses prediction techniques (e.g., PCA-based prediction techniques, etc.) to predict future faults (e.g., if the current operating state of connected equipment 610 is currently normal but trending towards a faulty state, etc.). Fault predictor 746 can determine a direction in which a series of samples of monitored variables 706 is moving and can predict whether the samples will reach a known operating state (e.g., a known fault state, a known normal state, etc.). Fault predictor 746 can determine a proximity of a sample to the known operating states and can estimate how long it will take the samples to reach a respective operating state. If the samples are moving toward a known faulty state, fault predictor 746 can generate a fault prediction 750. Fault predictions 750 can be stored in memory and/or communicated to client devices 448, remote systems and applications 444, building subsystems 428, or any other external system or device. In some embodiments, fault diagnoser 738 is configured to perform fault diagnosis to determine what may be causing connected equipment 610 to be trending towards a faulty operating state determined by fault predictor 746.

Fault predictions 750 may provide an advance warning of a fault associated with the known faulty state and/or facilitate taking preventative measures (e.g., by an operator, by predictive diagnostics system 502, etc.). Fault predictions 750 may identify a particular fault, a particular device of connected equipment 610 in which the fault is predicted to occur, and/or an estimated time at which the fault is estimated to occur. Fault predictions 750 can include fault indications as well as recommended actions to repair connected equipment 610 to prevent the fault from occurring. In some embodiments, fault predictor 1146 provides the fault predictions 750 to building controller 744. Building controller 744 can use the fault predictions to perform an automated control action. For example, building controller 744 can perform automated preventative actions to prevent the identified faults from occurring (e.g., change operating characteristics, derate operation, etc.).

Still referring to FIG. 7, memory 716 is shown to include a building controller 744. Building controller 744 can be configured to control one or more buildings, building systems, or building subsystems. For example, building controller 744 may utilize closed loop control, feedback control, PI control, model predictive control, or any other type of automated building control methodology to generate control signals for the connected equipment 610. In some embodiments, building controller 744 uses fault detections 734, fault diagnoses 742, and/or detected operating states to determine an appropriate control signal 748 for connected equipment 610. In other words, the control signals generated by building controller 744 can be based on the current operating state, as determined by fault detector 724 and/or fault diagnoser 738.

In some embodiments, building controller 744 receives the fault predictions 750 from fault predictor 746. Building controller 744 can use the fault predictions 750 to perform automated control actions to prevent predicted faults from occurring. For example, building controller 744 can automatically cause connected equipment 610 to enter a safety mode (e.g., derated operation, etc.) or shut down when a fault is predicted to occur (e.g., by providing a control signal 748 to connected equipment 610).

In some embodiments, building controller 744 controls connected equipment 610 using an automated staging algorithm. For example, connected equipment 610 can include array of chillers which can be staged automatically to accommodate varying loads. In response to a predicted fault in a particular chiller, building controller 744 can remove the chiller from the array of chillers in the control algorithm so that the automatic staging does not include the chiller for which the fault is predicted (e.g., shutting down or derating operation of the faulty chiller within the array of chillers and increasing operation of the remaining chillers within the array of chillers, etc.). This allows the faulty chiller to be taken offline for maintenance without affecting the performance of the staging algorithm.

In some embodiments, building controller 744 automatically compensates for the fault before the fault occurs. For example, building controller 744 can identify a decrease in performance or efficiency estimated to result from the predicted fault. Building controller 744 can automatically adjust the efficiency or expected performance of connected equipment 610 in an automated control algorithm that uses the efficiency or expected performance to determine an appropriate control signal for connected equipment 610. For example, if the predicted fault is expected to reduce chiller output by 25%, building controller 744 can automatically increase the control signal provided to the chiller by 25% to preemptively compensate for the expected decrease in performance. If the predicted fault is expected to increase chilled water temperature by a predetermined number of degrees, building controller 744 can automatically reduce the chilled water setpoint by the predetermined number of degrees so that the actual chilled water temperature will remain at the desired temperature.

Building controller 744 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via communications interface 710. In some embodiments, building controller 744 receives samples of monitored variables 706. Building controller 744 may apply the monitored variables and/or other inputs to a control algorithm or model (e.g., a building energy use model) to determine an output for one or more building control devices (e.g., dampers, air handling units, chillers, boilers, fans, pumps, etc.) in order to affect a variable state or condition within the building (e.g., zone temperature, humidity, air flow rate, etc.). Building controller 744 may operate the building control devices to maintain building conditions within a setpoint range, to optimize energy performance (e.g., to minimize energy consumption, to minimize energy cost, etc.), and/or to satisfy any constraint or combination of constraints as can be desirable for various implementations.

Fault Detection and Prediction

Figure 8:
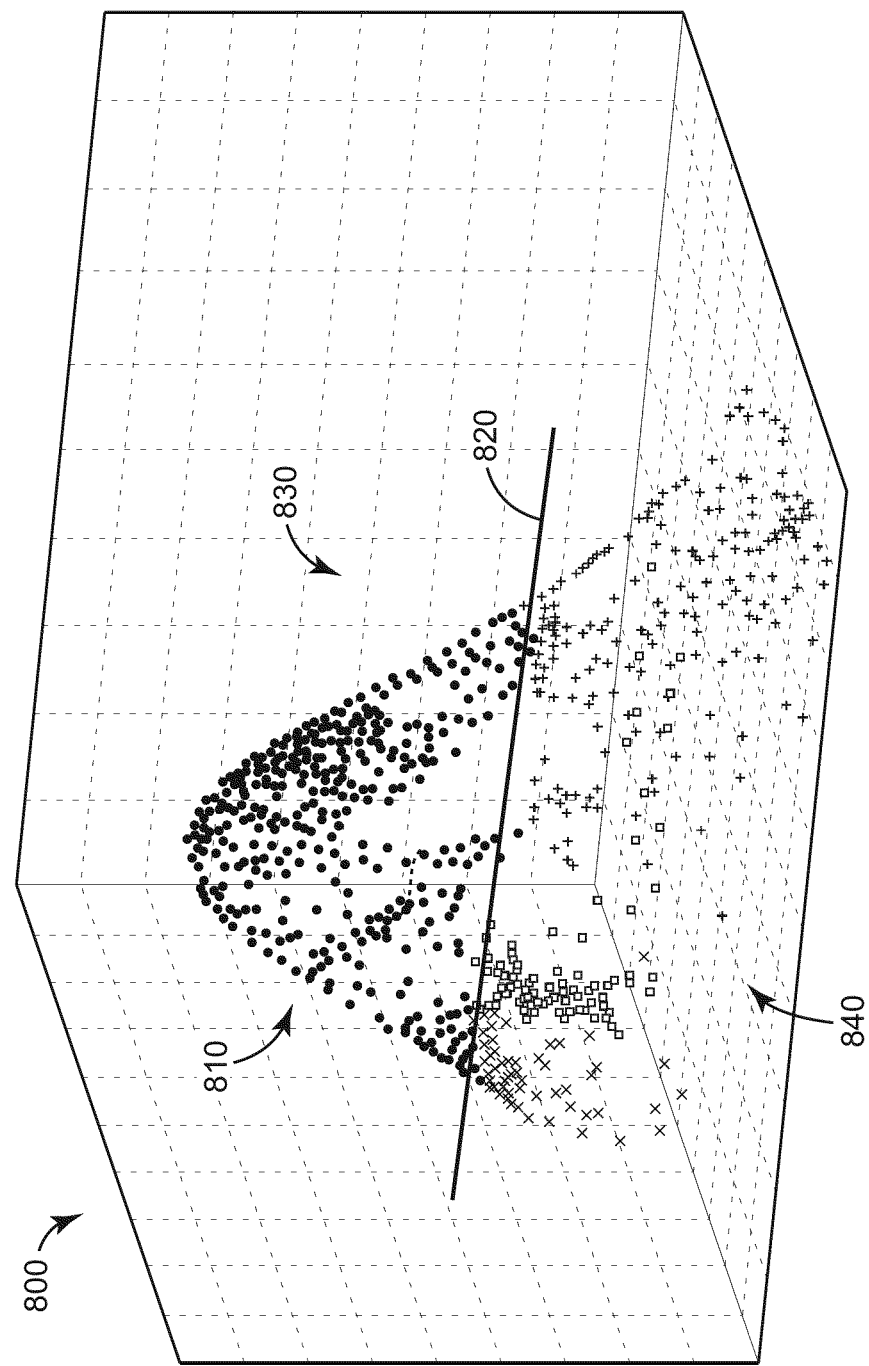
FIG. 8 is a three-dimensional probability distribution graph of various operating patterns of a component of a HVAC system, according to some embodiments.
Figure 9:
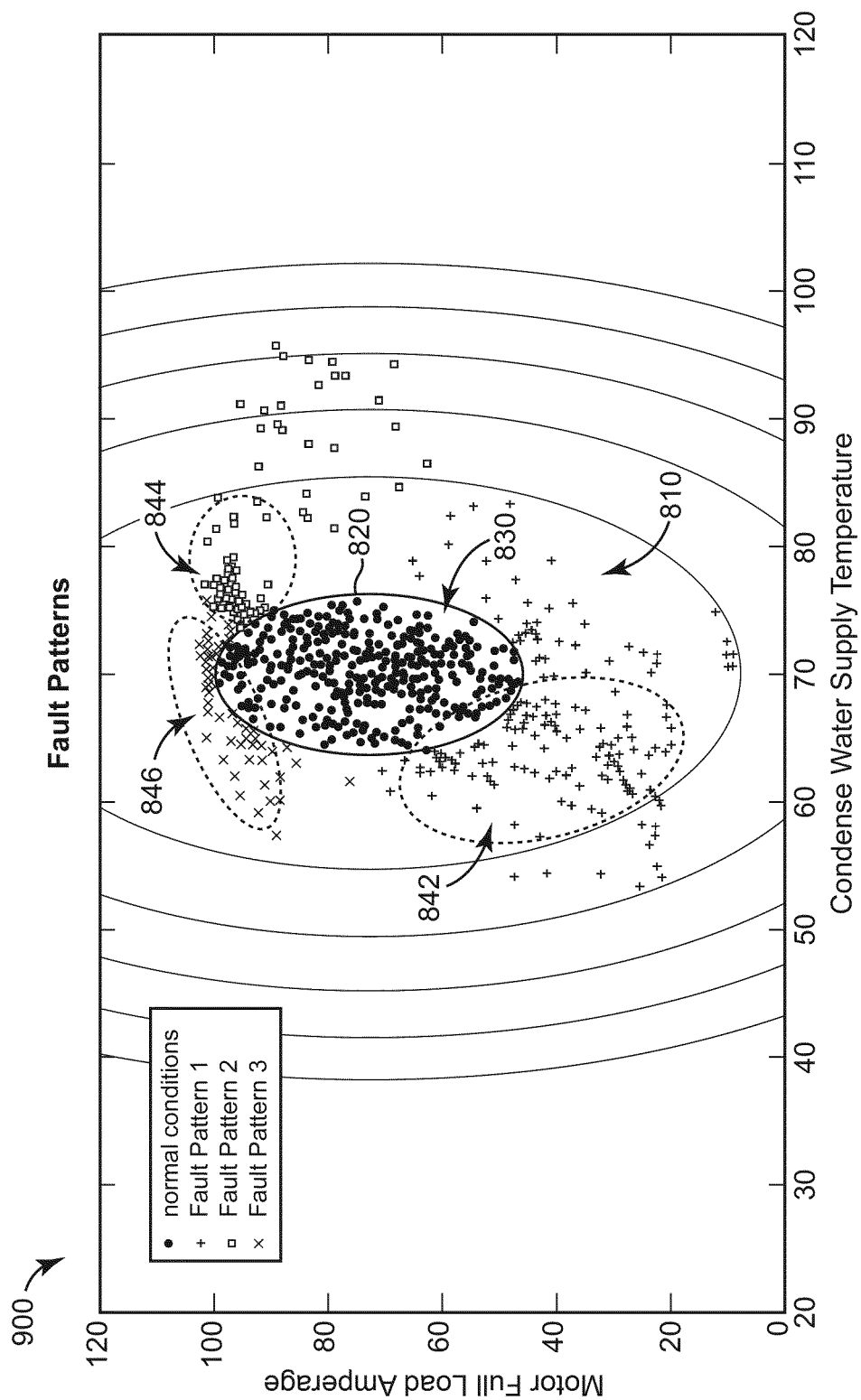
FIG. 9 is a two-dimensional view of the three-dimensional probability distribution graph of FIG. 8 mapped onto a two-dimensional parameter space, according to some embodiments.
Figure 10:
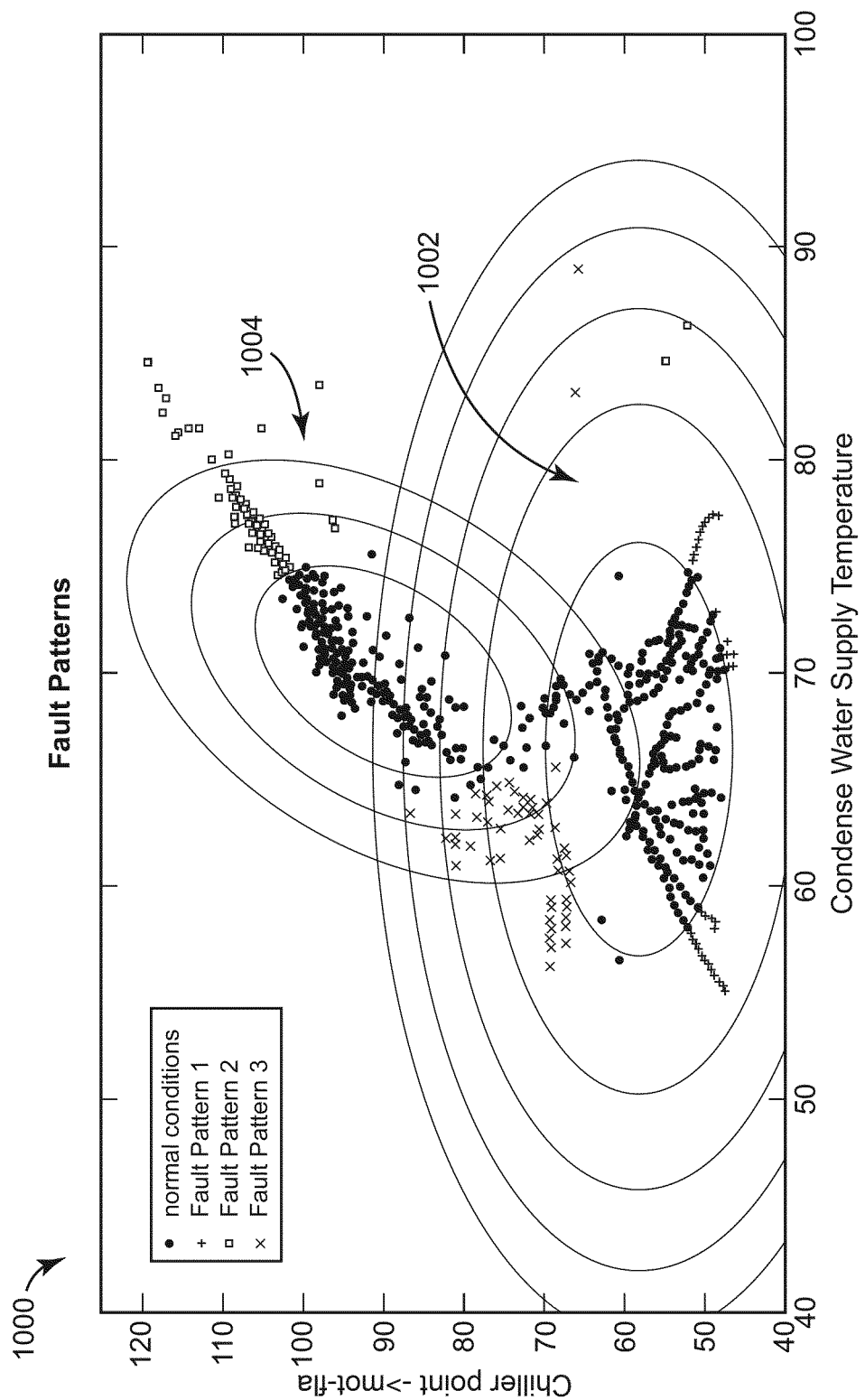
FIG. 10 is a graph depicting multiple probability distributions data sets mapped onto a two-dimensional parameter space, according to some embodiments.

Referring now to FIGS. 8-12, various processes and graphs may be performed/generated by predictive diagnostics system 502 to determine and/or predict faults (e.g., data-driven fault detection, fault diagnostics, and fault prediction performed by predictive diagnostics system 502). Referring specifically to FIGS. 8-10, various graphs are used to visually depict the fault prediction process performed by predictive diagnostics system 502. As shown in FIG. 8, predictive diagnostics system 502 can be configured to generate a probability distribution graph 800 having data points 810 of n parameters (e.g., two, four, six, ten, etc.) regarding operation of connected equipment 610 (e.g., from monitored variable 706, etc.). To create probability distribution graph 800, predictive diagnostics system 502 can be configured to accumulate data points 810 during an initial data collection period (e.g., over an extended period of time, six months, one year, two years, etc.). During the data collection period, faults can be flagged and the attributes at the time of the fault can be recorded. The faults that occur during the data collection period may thereby be logged and stored by predictive diagnostics system 502. Once trained, as described in more detail below, predictive diagnostics system 502 may be capable of identifying (e.g., make a distinction between, etc.) whether a pattern of the current operating conditions of connected equipment 610 is normal, faulty, or trending towards a faulty condition. By way of example, the more data points 810 collected, the more accurate the fault prediction capability of predictive diagnostics system 502 may be as the predictive algorithm receives increasingly more amounts of training.

To classify a normal condition from a faulty condition, predictive diagnostics system 502 may be configured to form a boundary 820 using a supervised machine learning technique. The boundary may be linear or non-linear. To form boundary 820, predicative diagnostics system 502 may be configured to use one or more functions, such as kernel functions. The kernel functions may be configured to take in the various attributes or parameters of data points 810 and find a correlation between data points 810. Additionally, the kernel functions may be configured to convert data points 810 into probability distribution graph 1000. With the probability distribution graph 800 generated, predictive diagnostics system 502 may be able to autonomously determine boundary 820 to determine which data points 810 correspond with a normal condition 830 and which data points 810 correspond with a faulty condition 840. Boundary 820 may be determined automatically based on the probability distribution of data points 810 (e.g., according to the standard deviation of the data points 810 from the center of probability distribution graph 800, etc.).

As shown in FIG. 9, predictive diagnostics system 502 can be configured to map or impose the higher-dimensionality (e.g., three-dimension, etc.) probability distribution graph 800 onto a two-dimensional parameter space to generate at fault diagnostic model 900. As shown in FIG. 9, data points 810 corresponding with normal conditions 830 of connected equipment 610 are disposed within boundary 820, and data points 810 corresponding with faulty conditions 840 are disposed outside boundary 820. Fault diagnostic model 900 is shown comparing two attributes of connected equipment 610 (e.g., motor full load amperage and condenser water supply temperature). It should be understood that fault diagnostic model 900 may be used to compare n parameters or attributes (e.g., two, three, four, six, etc.).

Following the mapping of probability distribution graph 800 onto a two-dimensional parameter space, predictive diagnostics system 502 can be configured compute patterns in faulty conditions 840 to subdivide the unseparated faulty conditions 840 into sub-patterns using an unsupervised machine learning technique. The unsupervised machine learning technique may include techniques such as clustering and the like. As shown in FIG. 9, predictive diagnostics system 502 can be configured to analyze data points 810 associated with faulty conditions 840 and subdivide faulty conditions 840 into a plurality of sub-patterns, shown as first fault pattern 842, second fault pattern 844, and third fault pattern 846. It should be understood that a different number of fault patterns (e.g., one, two, four, five, ten, etc.) may be determined by predictive diagnostics system based on differing operational history (i.e., historical operation data) of connected equipment 610. By way of example, data points 810 associated with (i) first fault pattern 842 may include data that follows a first pattern which indicates connected equipment 610 has or will experience a first fault type corresponding with first fault pattern 842, (ii) second fault pattern 844 may include data that follows a second pattern which indicates connected equipment 610 has or will experience a second fault type corresponding with second fault pattern 844, and (iii) third fault pattern 846 may include data that follows a third pattern which indicates connected equipment 610 has or will experience a third fault type corresponding with third fault pattern 846.

Predictive diagnostics system 502 can be configured to not only separate data points 810 between normal conditions 830 and faulty conditions 840, but further configured to subdivide faulty conditions into particular sub-patterns (e.g., first fault pattern 842, second fault pattern 844, third fault pattern 846, etc.). Dividing faulty conditions 840 into various sub-patterns may allow predictive diagnostics system 502 to predict and/or diagnose faulty conditions more efficiently and effectively. Each time a new sub-pattern is determined (e.g., an unprecedented fault, etc.), an operator may determine what caused such a fault pattern to occur and associate the fault pattern with a particular diagnosis (e.g., identify why the fault occurred, etc.). Therefore, the fault patterns will each be associated with a particular diagnosis that will be able to be automatically provided in the future by predictive diagnostic system 502 when a similar fault pattern is encountered.

After predictive diagnostics system 502 has generated fault diagnostic model 900 (as explained above with reference to FIGS. 8 and 9), predictive diagnostics system 502 may be configured to store fault diagnostic model 900 (e.g., in memory 716, PCA models 730, etc.) to facilitate evaluating future operation of connected equipment 610 to determine whether connected equipment 610 is operating under normal conditions, faulty conditions, or trending towards operating under faulty conditions. Predictive diagnostics system 502 may generate a plurality of fault diagnostics models to analyze patterns for different sets of attributes (e.g., data points 810 for two specific attributes, data points 810 for four specific attributes, etc.) and/or for each operating state (e.g., high, intermediate, low, etc.) of connected equipment 610. Therefore, the process performed by predictive diagnostics system 502 above can be repeated any number of times to generate any number of fault diagnostics models.

Predictive diagnostics system 502 (e.g., fault predictor 746, etc.) can be configured to utilize the fault diagnostic models to evaluate the current operation of connected equipment 610 for faults or potential faults, and then provide and/or automatically begin a suggested diagnostic process to correct the fault or potential fault. By way of example, upon receiving a new set of data regarding the current operation of connected equipment 610, predictive diagnostics system 502 may be configured to evaluate the new data by comparing the new data to one or more of the fault diagnostic models. If the data follows a pattern that corresponds with one of the fault patterns previously determined in a fault diagnostic model (e.g., first fault pattern 842, second fault pattern 844, third fault pattern 846, etc.), predictive diagnostic system 502 can identify the fault before it occurs based on the pattern (e.g., fault predictions 750) and determine which diagnostic procedure applies.

Identifying the fault before it occurs may provide an advance warning of a fault associated with a known faulty state and/or facilitate taking preventative measures (e.g., by an operator, by predictive diagnostics system 502, etc.). The fault prediction may identify a particular fault, a particular device of connected equipment 610 in which the fault is predicted to occur, and/or an estimated time at which the fault is estimated to occur. Fault predictions can include fault indications as well as recommended actions to repair connected equipment 610 to prevent the fault from occurring. In some embodiments, predictive diagnostics system 502 uses the fault predictions to perform automated control actions to prevent predicted faults from occurring. For example, predictive diagnostics system 502 can automatically cause connected equipment 610 to enter a safety mode (e.g., derated operation, etc.) or shut down when a fault is predicted to occur.

Referring to FIG. 10, predictive diagnostics system 502 may be configured to generate a comparison graph 1000 that facilitates comparing a first fault diagnostic model 1002 to a second fault diagnostic model 1004. First fault diagnostic model 1002 and second fault diagnostic model 1004 may be for the same connected equipment 610 or different (but similar) connected equipment (e.g., same type of equipment but at different locations, etc.). Predictive diagnostics system 502 may thereby be capable of learning multiple optimal operation subsets (e.g., if the density of normal data points are disseminated among multiple groups rather than an isolated whole, etc.).

Figure 11:
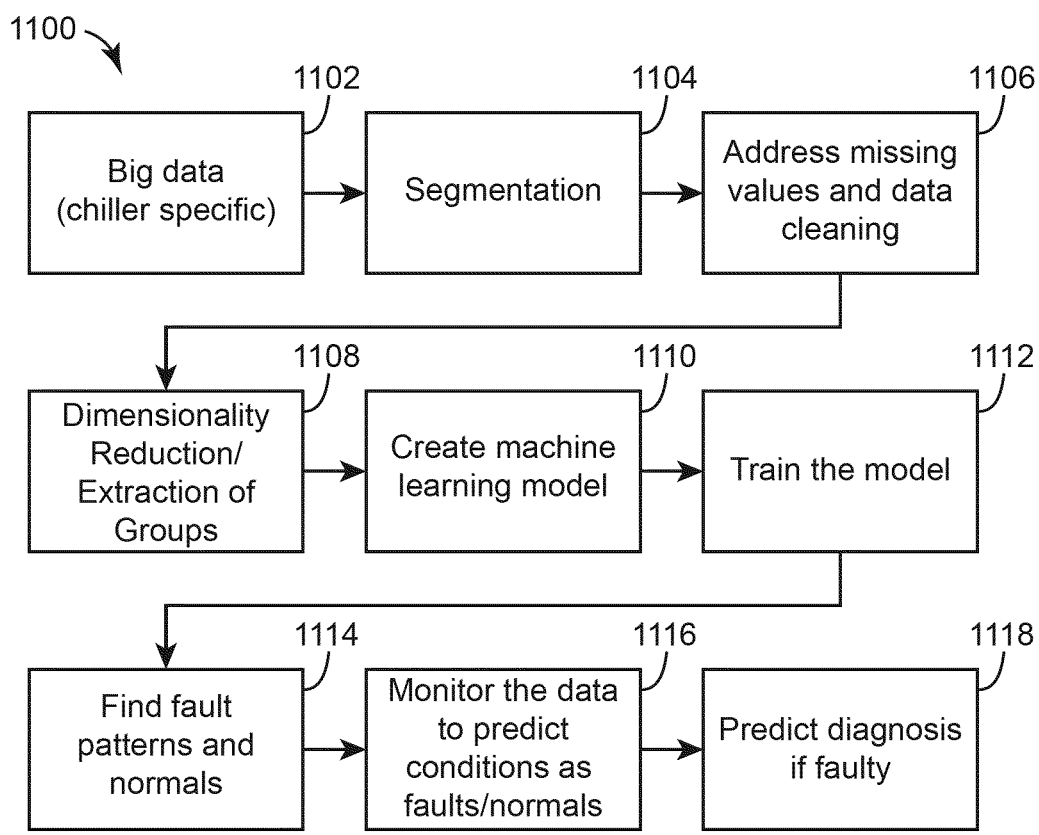
FIGS. 11 and 12 are block diagrams of a method for performing predictive diagnostics on one or more components of a HVAC system, according to some embodiments.

Referring to FIG. 11, a method 1100 for performing predictive diagnostics on connected equipment 610 (e.g., one or more components of a HVAC system, chiller 650, etc.) is shown according to an exemplary embodiment. According to an exemplary embodiment, method 1100 is performed by predictive diagnostics system 502 and/or various components thereof to predict faults in connected equipment 610 before the connected equipment 610 report the faults. Method 1100 may therefore be described in regards to predictive diagnostics system 502. As a brief overview, method 1100 facilitates autonomously creating a mathematical formulation for determining an optimal operational area for connected equipment 610 by learning through past, historical data regarding operation of connected equipment 610, and hence providing a trained model. After generating the trained model, method 1100 facilitates forecasting whether a new data point or points regarding current operation of connected equipment 610 indicates an anomaly/fault condition or not. If the data points lie within a determined fault region of the model, then connected equipment 610 may viably be operating at a point corresponding to or trending towards a faulty condition. Such a determination may give the user significant insight about when preventative maintenance related procedures may be required. Three main phases of method 1100 may include (i) a training phase, in which the algorithm learns a separation boundary between normal and faulty operation, (ii) exploring patterns exhibited by faults, and (iii) predictive diagnostics for predicted faults.

At step 1102, predictive diagnostics system 502 is configured to receive big data. The big data may include data specific to connected equipment 610 associated with predictive diagnostics system 502. The big data may also include data for similar equipment not associated with predictive diagnostics system 502 (e.g., same model/type of equipment in another location or same location, etc.). The big data may include past data, as well as current data, regarding the operation of connected equipment 610. By way of example, the big data may include monitored variables of connected equipment 610 for an extended period of time (e.g., six months, one year, two years, etc.). In some embodiments, step 1102 is performed by variable monitor 718, as described with reference to FIG. 7. The monitored variables may indicate past and/or current performance of connected equipment 610 or any other monitored system, device, or process. For example, the monitored variables can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients), or any other time-series values that characterize the performance of connected equipment 610. In some embodiments, the monitored variables are received from connected equipment 610 and/or from various devices thereof. For example, the monitored variables can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), or collections of BMS devices within building subsystems 428. In some embodiments, the monitored variables include n different time-series variables.

At step 1104, predictive diagnostics system 502 is configured to perform a segmentation process. Segmentation may include identifying, sorting, categorizing, labeling, and/or processing the monitored variables based on various operating conditions at the time the data was collected. By way of example, the various operating conditions may include, but are not limited to, the demand from or operating state of connected equipment 610 when the data was collected (e.g., separate data associated with a high, intermediate, and low mode or stage of operation, etc.), the time of the year the data was collected (e.g., summer, fall, winter, spring, etc.), and/or other conditions that may be useful for segmentation.

At step 1106, predictive diagnostics system 502 is configured to address missing values, perform data cleaning, data recovering, and/or data quality checking to make the data uniform or consistent such that the data is able to be more accurately and readily analyzed. The data cleansing may include removing erroneous portions of the data that may not be used by predictive diagnostics system 502 and/or scrubbing the data to separate useful portions from erroneous portions. The non-erroneous portions may also be modified (e.g., altered, fixed, corrected, restored, standardized, etc.) to provide the data in a desired, uniform format. The data recovering may include restoring some of the missing data field values (e.g., in an algorithmic approach based on other data field values available in the non-erroneous portion of the data, etc.). Data quality checking may include scanning through individual data fields and validating recorded data values (e.g., there cannot be more than 31 days in a month, dates cannot extend into the future, etc.). At step 1108, predictive diagnostics system 502 is configured to perform dimensionality reduction and/or group extraction.

At step 1110, predictive diagnostics system 502 is configured to create a machine learning model. By way of example, predictive diagnostics system 502 may be configured to utilize supervised machine learning to produce a model or function from the big data (e.g., the monitored variables history, probability distribution, etc.). The model may then be used by predictive diagnostics system 502 for mapping new data received by predictive diagnostics system 502 to classify such data as indicating normal operation, faulty operation, or operation that is trending to be faulty. At step 1112, predictive diagnostics system 502 is configured to train the model. By way of example, predictive diagnostics system 502 may be configured to apply kernel functions to the model to facilitate applying various kernel methods to the data with the model (e.g., regression analysis, cluster analysis, statistical classification, etc.).

At step 1114, predictive diagnostics system 502 is configured to find fault patterns and normal patterns in the data. By way of example, predictive diagnostics system 502 may be configure to utilize unsupervised machine learning to identify the fault patterns and the normal patterns, and then subdivide the fault patterns into sub-patterns to identify specific fault types. At step 1116, predictive diagnostics system 502 is configured to monitor data (e.g., the monitored variables, etc.) regarding the current operation of connected equipment 610 to predict whether operation of connected equipment 610 is trending towards a fault condition or remaining in a normal condition. At step 1118, predictive diagnostics system 502 is configured to predict a diagnosis for connected equipment 610 in response to the operation of connected equipment trending towards the fault condition.

Figure 12:
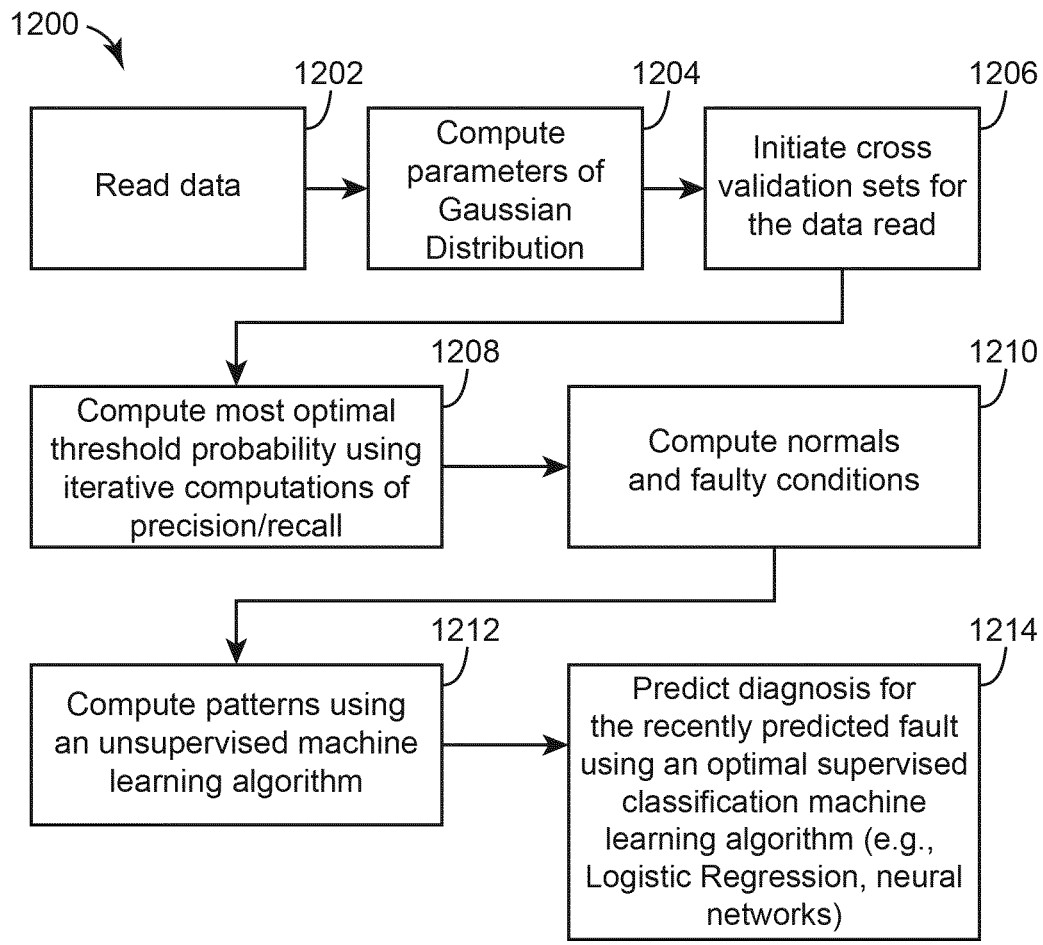

Referring now to FIG. 12, a method 1200 for performing predictive diagnostics on connected equipment 610 is shown according to an exemplary embodiment. Method 1200 may be included in method 1100 at the training phase (e.g., step 1110, etc.). At step 1202, predictive diagnostics system 502 is configured to read data (e.g., the monitored variables, etc.) regarding current and/or past operation of connected equipment 610. At step 1204, predictive diagnostics system 502 is configured to compute parameters of Gaussian distribution. At step 1206, predictive diagnostics system 502 is configured to initiate cross-validation sets for the read data. At step 1208, predictive diagnostics system 502 is configured to compute the most optimal threshold probability using iterative computations of precision and recall.

At step 1210, predictive diagnostics system 502 is configured to compute normal conditions and faulty conditions. At step 1212, predictive diagnostics system 502 is configured to compute patterns using an unsupervised machine learning algorithm. At step 1214, predictive diagnostics system 502 is configured to predict a diagnosis for the recently predicted faults using an optimal supervised classification machine learning algorithm (e.g., logistic regression, neural networks, etc.).

Connected Equipment and Adaptive Control

Figure 13:
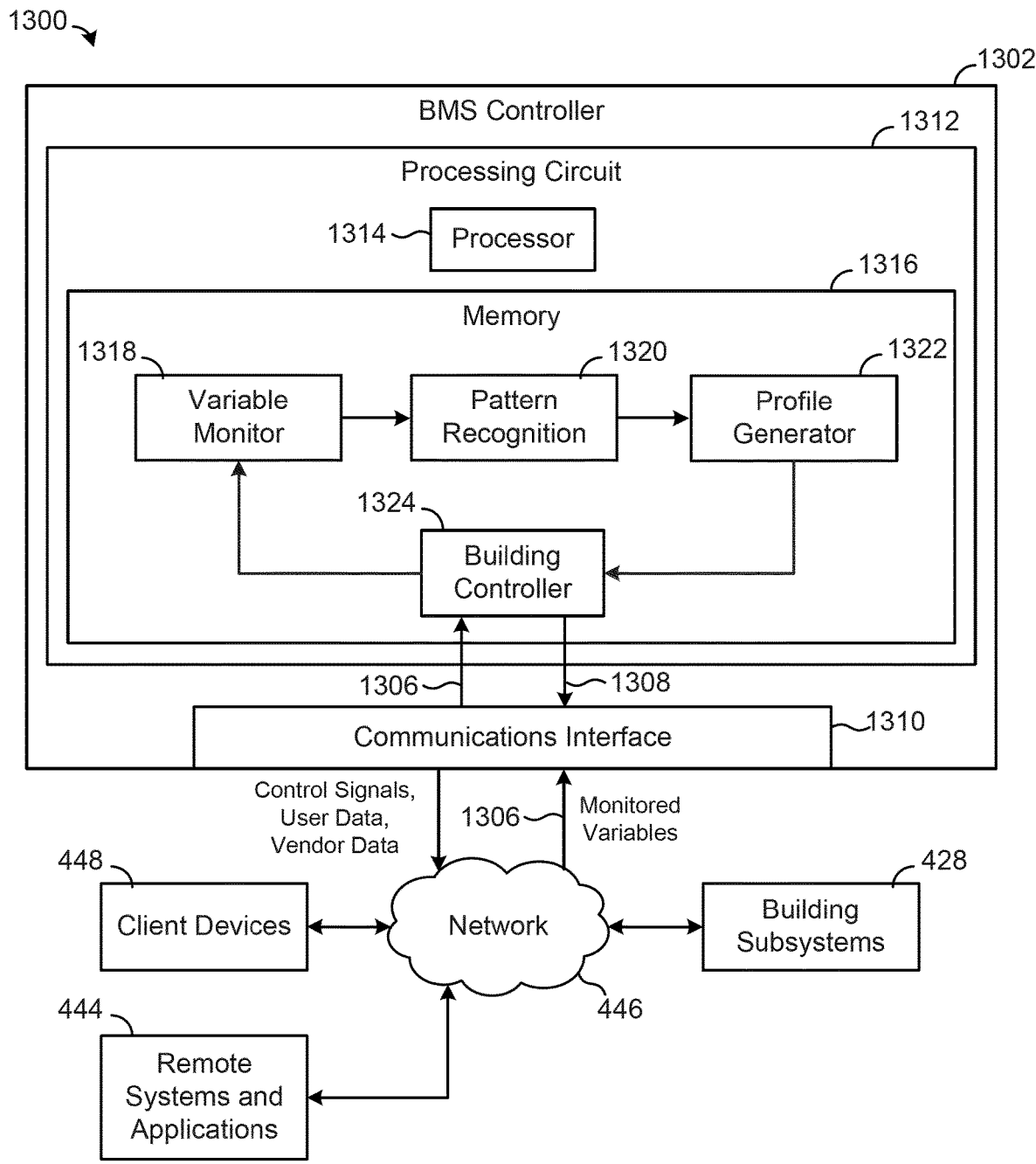
FIG. 13 is a block diagram of a building management system (BMS) which can be used to monitor and control the building of FIG. 1, according to some embodiments.

Referring now to FIG. 13, a block diagram of another building management system (BMS) 1300 is shown, according to some embodiments. BMS 1300 can include many of the same components as BMS 400 and BMS 500 as described with reference to FIGS. 4 and 5. For example, BMS 1300 is shown to include building subsystems 428, network 446, and client devices 448. BMS 1300 includes a building controller 1302. In one embodiment, building controller 1302 is a supervisory system. In other embodiments, BMS controller 1302 is a local system (e.g., such as a smart thermostat, etc.). As a brief overview, BMS controller 1302 is configured to gather data from connected subsystems (e.g., a light sensor of lighting systems, a temperature sensor of HVAC systems, an occupancy sensor of security systems, etc.) and control the functions of the subsystems based on recognized personalized preferences in an automated manner. BMS controller 1302 may be configured to handle multiple disparate communication protocols (e.g., BACnet, Modbus, etc.) from the connected subsystems. The data being taken as input from the connected subsystems may be harmoniously combined and fed into a database. BMS controller 1302 may implement machine learning on the gathered data to identify and generate user categories or profiles, independent of user indicated settings. BMS controller 1302 may control the connected subsystems according to the identified user profiles.

BMS controller 1302 may be further configured to present the collected data in a graphical or statistical representation (e.g., on a webpage interface, etc.) for user viewing. A user may choose to keep the current settings or trigger a change to the automatically generated user profile. BMS controller 1302 may be further configured to provide the data to vendors for computational purposes and vendor side analytics. The vendor may therefore be able to identify how different kinds of users are using certain devices and/or identify energy consumption in a particular area.

Home automation or domotics is a field within building automation, specializing in the specific automation requirements of private homes, and in the application of automation techniques for the comfort and security of its residents. When home automation is installed during construction of a new home, usually control wires are added before the drywall is installed. These control wires may run to BMS controller 1302, which will then control the environment. BMS controller 1302 may therefore be applicable as both a BMS in larger, commercial buildings and residential uses. Alternatively, BMS controller 1302 may be part of an external system such as a smart thermostat that can be placed in any desired location of the home and wirelessly and/or non-wirelessly communicate with various subsystems (e.g., lights, HVAC, etc.; a retrofit system, etc.).

According to an exemplary embodiment, BMS 1300 is configured to bring all the technology and devices together onto a single platform so they work together seamlessly and intelligently. Anything and everything connected to BMS controller 1302 can be monitored, managed, and controlled anytime from any local or remote devices (e.g., using wired communication protocol, using wireless communication protocol, from a laptop, tablet, smartphone, or other smart device, etc.). According to an exemplary embodiment, BMS controller 1302 is configured to facilitate performance optimization through machine learning to optimize control of building subsystems 428, and in turn reduce energy consumption and costs.

As shown in FIG. 13, BMS controller 1302 includes a communications interface 1310 and a processing circuit 1312. Communications interface 1310 may facilitate communications between BMS controller 1302 and various external systems or devices. For example, BMS controller 1302 may receive the monitored variables from building subsystems 428 and provide control signals to building subsystems via communications interface 1310. Communications interface 1310 may also be used to communicate with remote systems and applications 444, client devices 448, and/or any other external system or device. For example, BMS controller 1302 may provide profile data to remote systems and applications 444, client devices 448, or any other external system or device via communications interface 1310 (e.g., for user viewing, vendor viewing, etc.).

Communications interface 1310 can include any number and/or type of wired or wireless communications interfaces (e.g., jacks, antennas, transmitters, receivers, transceivers, wire terminals, etc.). For example, communications interface 1310 can include an Ethernet card and port for sending and receiving data via an Ethernet-based communications link or network. As another example, communications interface 1310 can include a WiFi transceiver, a NFC transceiver, a cellular transceiver, a mobile phone transceiver, or the like for communicating via a wireless communications network. In some embodiments, communications interface 1310 includes RS232 and/or RS485 circuitry for communicating with BMS devices (e.g., chillers, controllers, etc.). Communications interface 1310 can be configured to use any of a variety of communications protocols (e.g., BACNet, Modbus, N2, MSTP, Zigbee, etc.). Communications via interface 1310 can be direct (e.g., local wired or wireless communications) or via an intermediate communications network 446 (e.g., a WAN, the Internet, a cellular network, etc.). Communications interface 1310 can be communicably connected with processing circuit 1312 such that processing circuit 1312 and the various components thereof can send and receive data via communications interface 1310.

Processing circuit 1312 is shown to include a processor 1314 and memory 1316. Processor 1314 can be implemented as a general purpose processor, an application specific integrated circuit (ASIC), one or more field programmable gate arrays (FPGAs), a group of processing components, or other suitable electronic processing components. Memory 1316 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 1316 can be or include volatile memory or non-volatile memory. Memory 1316 can include database components, object code components, script components, or any other type of information structure for supporting the various activities and information structures described in the present application. According to some embodiments, memory 1316 is communicably connected to processor 1314 via processing circuit 1312 and includes computer code for executing (e.g., by processing circuit 1312 and/or processor 1314) one or more processes described herein.

Still referring to FIG. 13, memory 1316 is shown to include a variable monitor 1318. Variable monitor 1318 may be configured to receive and store one or more variables (i.e., monitored variables 1308) from building subsystems 428. Variable monitor 1318 may receive monitored variables 1308 continuously or periodically (e.g., every second, every five seconds, every thirty seconds, every minute, every five minutes, etc.). By way of example, variable monitor 1318 may receive temperature data from one or more temperature sensors of HVAC subsystem 440 of building subsystems 428 regarding the temperature in one or more rooms of building 10. By way of another example, variable monitor 1318 may receive a temperature indication from one or more thermostats of HVAC subsystem 440 of building subsystems 428 in one or more rooms of building 10. By way of still another example, variable monitor 1318 may receive occupancy data from one or more occupancy sensors of security subsystem 438 of building subsystems 428 regarding the occupancy (e.g., number of occupants, identity of one or more of the occupants, etc.) in one or more rooms of building 10. By way of yet another example, variable monitor 1318 may receive light data from one or more light sensors of lighting subsystem 442 of building subsystems 428 regarding the light level in one or more rooms of building 10. By way of a further example, variable monitor 1318 may receive time data from an internal clock of BMS controller 1302 and/or an external clock regarding the current time where the BMS controller 1332 is located. By way of still a further example, variable monitor 1318 may receive room usage data regarding an indication of which room the aforementioned data (e.g., the temperature data, the temperature indication, the light data, the occupancy data, the time data, etc.) is being received for and monitored (e.g., a room ID, etc.). Variable monitor 1318 may receive still other data regarding one or more rooms of building 10. Variable monitor 1318 can also be configured to receive past data (e.g., monitored variables 1318) that indicate the past history of data for one or more rooms of building 10.

According to an exemplary embodiment, variable monitor 1318 is configured to perform an aggregation and segmentation process. Aggregation and segmentation may include identifying, sorting, categorizing, labeling, and/or processing monitored variables 1306 such that all the room usage data for each respective room of building 10 is separated and aggregated such that the data for each respective room of building 10 may be analyzed individually. By way of example, variable monitor 1318 may be configured to associate the temperature data, the temperature indication, the occupancy data, the time data, the light data, etc. (i.e., the room usage data) for each respective room with a corresponding room number or ID.

Still referring to FIG. 13, memory 1316 is shown to include pattern recognition 1320. Pattern recognition 1320 may be configured to analyze the room usage data (e.g., the temperature data, the temperature indication, the occupancy data, the time data, the light data, etc.) regarding the use of a respective room of building 10 to recognize patterns of use (e.g., temperature setpoint, light level, occupancy count, etc. at certain times of the day) by various occupants and/or at various times. By way of example, pattern recognition 1320 may utilize unsupervised machine learning techniques to identify patterns in the room usage data and may correlate such patterns with a respective time and/or occupant. Pattern recognition 1320 may thereby facilitate BMS controller 1302 in learning preferences for specific rooms and/or occupants with no manual intervention from the occupants being necessary (e.g., the occupants do not need to set a predefined schedule for lights, air conditioning, heating, etc.). Pattern recognition 1320 is configured to increase the accuracy of the room and/or occupancy preferences as more room usage data is compiled such that the patterns become more predictable.

By way of example, pattern recognition 1320 may be configured to recognize that a certain number of occupants or a specific occupant is in a respective room around a particular time of day on a recognizable pattern. Based on that identification, pattern recognition 1320 may learn the preferences of the occupants (e.g., light level, temperature levels, etc.) such that BMS controller 1302 may automatically implement those preferences at the time of the day in which the pattern is related to, as described in more detail herein. For example, a single person may enter a respective room on a daily basis from 4:00 PM to 5:00 PM. Pattern recognition 1320 may be configured to recognize this pattern to facilitate implementing the preferences identified for that person prior to their entry or upon their entry into the room. As another example, a group of five people may hold a meeting in a respective room from 12:00 PM to 1:00 PM every Wednesday. Pattern recognition 1320 may be configured to recognize this pattern to facilitate implementing the preferences identified for that group of people prior to their entry or upon their entry into the room.

Figure 14:
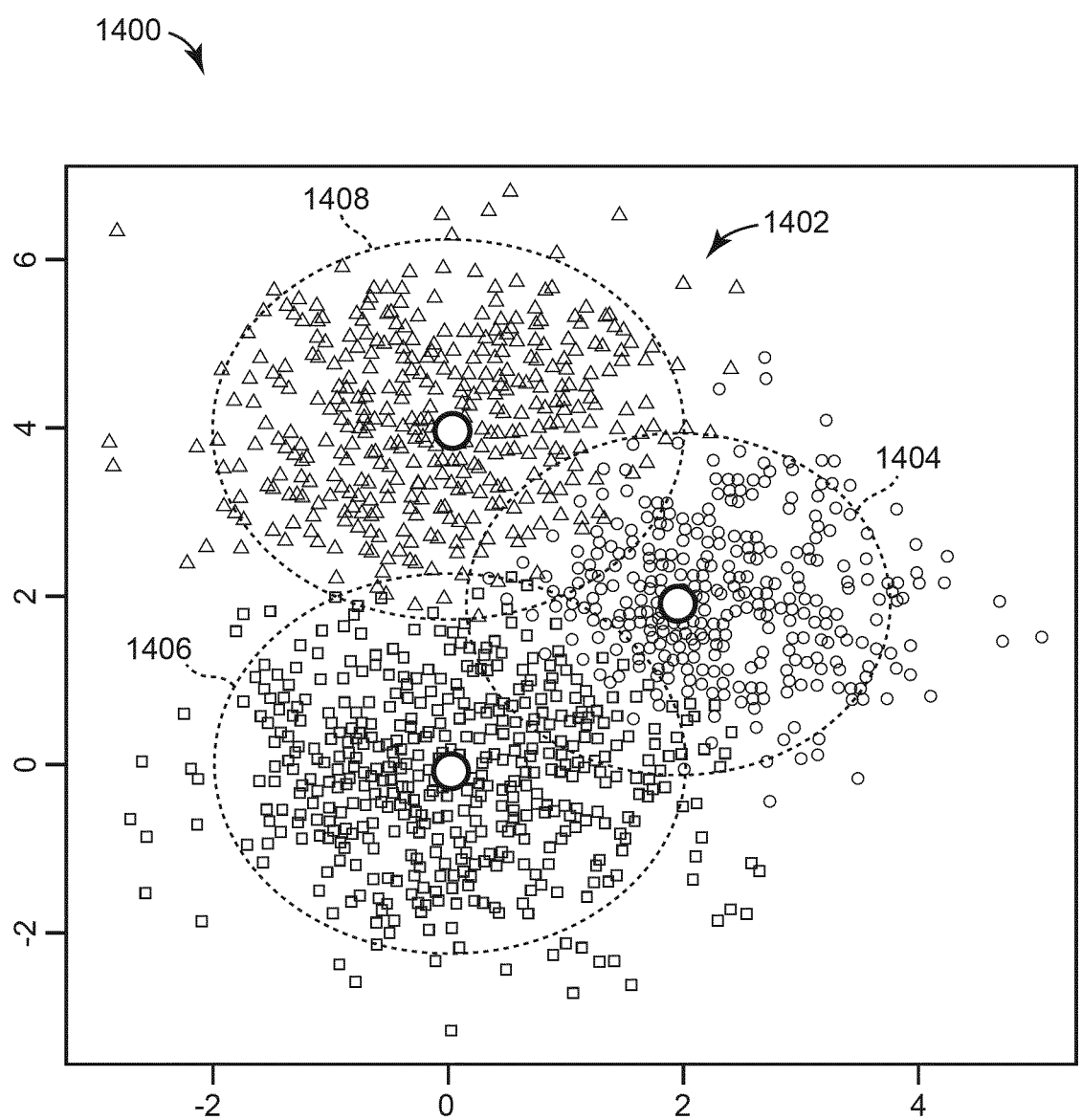
FIG. 14 is a graph of room usage data indicating various patterns for adaptive building subsystem control, according to some embodiments.

Referring now to FIG. 14, a graph 1400 of room usage data 1402 (e.g., the temperature data, the temperature indication, the light data, the occupancy data, the time data, etc.) indicating various patterns for adaptive building subsystem control is shown according to an exemplary embodiment. As shown in FIG. 14, pattern recognition 1320 is configured to analyze room usage data 1402 (i.e., monitored variable 1306 for a respective room) to identify patterns in the room usage data 1402, shown as first usage pattern 1404, second usage pattern 1406, and third usage pattern 1408. It should be understood that pattern recognition 1320 may identify any number of usage patterns for a respective room dependent on the various uses thereof (e.g., an individual's office, a common area, a conference room, etc.). First usage pattern 1404, second usage pattern 1406, third usage pattern 1408, etc. may indicate the typical use of a room (e.g., temperature set point, light level, etc.) for at a specific time of the day, a specific day of the week, for a specific number of occupants, and/or still other factors.

Referring back to FIG. 13, memory 1316 is shown to include profile generator 1322. Profile generator 1322 may be configured to develop user profiles and/or time profiles for a respective room based on the identified usage patterns by pattern recognition 1320. The user and/or time profiles may define specific room parameters for a respective occupant and/or time of the day/week. By way of example, the user and/or profiles may define a temperature setpoint and/or a lighting level for a room based on the user and/or time of the day/week. The profile generator 1322 may be configured to automatically update the user and/or time profiles as variable monitor 1316 gathers increasing amounts of room usage data and/or pattern recognition 1320 identifies additional patterns.

Still referring to FIG. 13, memory 1316 is shown to include building controller 1324. Building controller 1324 may be configured to control building subsystems 428 according to the generated user and/or time profiles. By way of example, building controller 1324 may be configured to control HVAC subsystem 440 (e.g., a fan, an air conditioner, etc.) to provide a heated or cooled airflow to a room to effect a certain temperature in the room based on the user and/or time profile. By way of another example, building controller 1324 may be configured to controller lighting subsystem 442 (e.g., lights, etc.) to effect a certain light level in a room based on the user and/or time profile. For example, building controller 1324 may bring the temperature and/or light level to a specific setpoint at a certain time of the day based on the preferences of the occupants thereof determined by pattern recognition 1320. As another example, building controller 1324 may bring the temperature and/or light level to a specific setpoint in response to a certain occupant walking into the room based on the preferences of the occupants thereof determined by pattern recognition 1320.

Building controller 1324 may be further configured to present the room usage data and/or the user/time profile in a graphical or statistical representation (e.g., on a webpage interface, on client devices 448, on remote systems and applications 444, etc.) for user viewing. A user may choose to keep the current autonomously generated settings or trigger a change to the automatically generated user and/or time profile. Building controller 1324 may be further configured to provide the room usage data to vendors (e.g., on a webpage interface, on client devices 448, on remote systems and applications 444, etc.) for computational purposes and vendor side analytics. The vendor may therefore be able to identify how different kinds of users are using certain devices and/or identify energy consumption in a particular area.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The invention claimed is:

1. A controller for one or more building subsystems for a building, comprising:
a processor configured to:
receive room usage data regarding use of a respective room of the building, the room usage data including information regarding at least one of a temperature setpoint, a light level, an occupancy count, a time of a day, or a day of a week correlated to a respective occupant of the respective room;
determine a usage pattern in the room usage data;
generate at least one of a time profile or a user profile comprising preferences for the respective room for a respective occupant based on a usage pattern of the usage patterns; and
control the one or more building subsystems based on the at least one of the time profile or the user profile, wherein the one or more building subsystems comprise at least one of a heating, ventilation, and air conditioning (HVAC) system, a lighting system, or a security system, and wherein the one or more building subsystems are controlled by an automated control action comprising increasing an output of equipment to preemptively compensate for an expected decrease in performance in a future based on a predicted fault.

2. The controller of claim 1, wherein the one or more building subsystems comprises the heating, ventilation, and air conditioning (HVAC) system.

3. The controller of claim 1, wherein the controller is a smart thermostat that is positioned in the respective room.

4. The controller of claim 1, wherein the processor is configured to:
receive the room usage data regarding a plurality of rooms within the building, wherein the room usage data includes a room ID for each room of the plurality of rooms;
segregate and aggregate the room usage data by room based on the room ID associated therewith;
determine usage patterns in each of the plurality of rooms; and
control the building subsystems based on the at least one of the time profile or the user profile for each of the plurality of rooms individually.

5. The controller of claim 1, wherein the processor is configured to generate the at least one of the time profile or the user profile absent manual operator intervention.

6. The controller of claim 1, wherein the processor is configured to:
- identify a current time; and
- control the building subsystems according to the time profile based on the current time.

7. The controller of claim 1, wherein the processor is configured to:
- identify an occupant within the room; and
- control the building subsystems based on the user profile associated with the occupant.

8. A method for controlling an environment of a room of a building, the method comprising:
- receiving room usage data regarding use of a room of the building, the room usage data including information regarding a temperature setpoint, time data, a light level, and an occupant of the room;
- determine usage patterns in the room usage data;
- generating a user profile comprising preferences for the room for the occupant based on a usage pattern of the usage patterns; and
- controlling the environment using one or more building subsystems based on the user profile and the occupant occupying the room, wherein the one or more building subsystems comprise at least one of a heating, ventilation, and air conditioning (HVAC) system, a lighting system, or a security system, and wherein the environment is controlled by an automated control action comprising increasing an output of equipment to preemptively compensate for an expected decrease in performance in a future based on a predicted fault.

9. The method of claim 8, wherein the one or more building subsystems comprises a heating, ventilation, and air conditioning (HVAC) system and a controller.

10. The method of claim 8, wherein the one or more building subsystems comprise at least one of the lighting system, or the security system.

11. The method of claim 9, wherein the controller is a smart thermostat that is positioned in the room.

12. The method of claim 8, further comprising:
- presenting the room usage data graphically to the occupant and allowing the occupant to modify the room usage data.

13. The method of claim 8, wherein the room usage data is generated by unsupervised learning.

14. A building management system for a building comprising building subsystems, the building management system comprising:
- a controller coupled to at least one building subsystem, the controller configured to:
  - receive room usage data regarding use of a respective room of the building, the room usage data including information regarding at least one of a temperature setpoint, a light level, an occupancy count, a time of a day, or the day of a week;
  - determine usage patterns in the room usage data and present the usage patterns to a user on a web interface;
  - receive changes provided by the user;
  - generate at least one of a time profile or a user profile to correlate the usage patterns with preferences for the respective room for at least one of a respective time or a respective occupant; and
  - control the at least one building subsystem based on the at least one of the time profile or the user profile, wherein the at least one building subsystem comprises at least one of a heating, ventilation, and air conditioning (HVAC) system, a lighting system, or a security system, wherein the at least one building subsystem is controlled by an automated control action comprising increasing an output of equipment to preemptively compensate for an expected decrease in performance in a future based on a predicted fault.

15. The building management system of claim 14, wherein the controller is a smart thermostat that is disposed in the respective room.

16. The building management system of claim 14, wherein the controller is configured to:
- receive the room usage data regarding a plurality of rooms within the building, wherein the room usage data includes a room ID for each room of the plurality of rooms;
- segregate and aggregate the room usage data by room based on the room ID associated therewith;
- determine the usage patterns in each of the plurality of rooms; and
- control the at least one building subsystem based on the at least one of the time profile or the user profile for each of the plurality of rooms individually.

17. The building management system of claim 14, wherein the controller is configured to generate the at least one of the time profile or the user profile using unsupervised machine learning.

18. The building management system of claim 14, wherein the controller is configured to:
- identify a current time; and
- control the at least one building subsystem according to the time profile based on the current time.

19. The building management system of claim 14, wherein the controller is configured to:
- identify that the respective occupant is within the room; and
- control the at least one building subsystem based on the user profile associated with the respective occupant being in the room.

* * * * *